US008667387B2

(12) United States Patent
Sahota et al.

(10) Patent No.: US 8,667,387 B2
(45) Date of Patent: *Mar. 4, 2014

(54) METHOD AND SYSTEM FOR TRANSFORMING CONTENT FOR EXECUTION ON MULTIPLE PLATFORMS

(75) Inventors: Ranjit Sahota, Fairfax, CA (US); John Carney, Sausalito, CA (US); David de Andrade, San Anselmo, CA (US); Mark Knowles, Fairfax, CA (US)

(73) Assignee: TVWorks, LLC, Philadelphia, PA (US)

(*) Notice: Subject to any disclaimer, the term of this patent is extended or adjusted under 35 U.S.C. 154(b) by 301 days.

This patent is subject to a terminal disclaimer.

(21) Appl. No.: 13/083,710

(22) Filed: Apr. 11, 2011

(65) Prior Publication Data

US 2011/0191667 A1  Aug. 4, 2011

Related U.S. Application Data

(60) Continuation of application No. 11/023,178, filed on Dec. 22, 2004, now Pat. No. 7,930,631, which is a division of application No. 09/841,017, filed on Apr. 23, 2001, now Pat. No. 7,702,995.

(60) Provisional application No. 60/199,686, filed on Apr. 24, 2000.

(51) Int. Cl.
  *G06F 17/00* (2006.01)
(52) U.S. Cl.
  USPC ........................................................... 715/234
(58) Field of Classification Search
  USPC .............. 715/234, 239, 203, 255; 725/36, 40; 348/563
  See application file for complete search history.

(56) References Cited

U.S. PATENT DOCUMENTS

| | | |
|---|---|---|
| 4,647,974 A | 3/1987 | Butler et al. |
| 5,469,206 A | 11/1995 | Strubbe et al. |
| 5,485,221 A | 1/1996 | Banker et al. |
| 5,579,057 A | 11/1996 | Banker et al. |
| 5,592,551 A | 1/1997 | Lett et al. |
| 5,600,364 A | 2/1997 | Hendricks et al. |
| 5,671,377 A | 9/1997 | Bleidt et al. |
| 5,689,799 A | 11/1997 | Dougherty et al. |
| 5,706,434 A | 1/1998 | Kremen et al. |
| 5,708,845 A | 1/1998 | Wistendahl et al. |

(Continued)

FOREIGN PATENT DOCUMENTS

| | | |
|---|---|---|
| EP | 942595 | 9/1999 |
| WO | 2005006758 A1 | 1/2005 |

OTHER PUBLICATIONS

International Search Report, Sep. 10, 2001.

(Continued)

*Primary Examiner* — Laurie Ries
(74) *Attorney, Agent, or Firm* — Banner & Witcoff, Ltd.

(57) ABSTRACT

A method and system are disclosed for acquiring and transforming existing content (e.g., Hyper Text Markup Language HTML content) for display and execution on multiple platforms and architectures. In one embodiment, capture templates are created to harvest content from disparate content sources on multiple platforms. Data is extracted from the content from the disparate content sources using the created capture templates that drives extracting process. A standardized data stream is generated from the extracted data. The standardized data stream is provided for display on one or more different type of platforms.

20 Claims, 23 Drawing Sheets

(56) References Cited

U.S. PATENT DOCUMENTS

| | | |
|---|---|---|
| 5,727,159 A | 3/1998 | Kikinis |
| 5,742,680 A | 4/1998 | Wilson |
| 5,774,664 A | 6/1998 | Hidary et al. |
| 5,774,666 A | 6/1998 | Portuesi |
| 5,809,242 A | 9/1998 | Shaw et al. |
| 5,819,269 A | 10/1998 | Uomini |
| 5,826,258 A | 10/1998 | Gupta et al. |
| 5,872,588 A | 2/1999 | Aras et al. |
| 5,895,477 A | 4/1999 | Orr et al. |
| 5,925,595 A | 7/1999 | Seitz et al. |
| 5,929,849 A | 7/1999 | Kikinis |
| 5,937,331 A | 8/1999 | Kalluri et al. |
| 5,961,603 A | 10/1999 | Kunkel et al. |
| 5,969,715 A | 10/1999 | Dougherty et al. |
| 5,982,445 A | 11/1999 | Eyer et al. |
| 6,002,394 A | 12/1999 | Schein et al. |
| 6,006,256 A | 12/1999 | Zdepski et al. |
| 6,008,836 A | 12/1999 | Bruck et al. |
| 6,014,134 A | 1/2000 | Bell et al. |
| 6,014,502 A | 1/2000 | Moraes |
| 6,018,764 A | 1/2000 | Field et al. |
| 6,018,768 A | 1/2000 | Ullman et al. |
| 6,025,837 A | 2/2000 | Matthews, III et al. |
| 6,029,045 A | 2/2000 | Picco et al. |
| 6,049,333 A | 4/2000 | LaJoie et al. |
| 6,055,566 A * | 4/2000 | Kikinis ......................... 709/219 |
| 6,076,734 A | 6/2000 | Dougherty et al. |
| 6,101,510 A | 8/2000 | Stone et al. |
| 6,169,543 B1 | 1/2001 | Wehmeyer |
| 6,182,072 B1 | 1/2001 | Leak et al. |
| 6,188,398 B1 | 2/2001 | Collins-Rector et al. |
| 6,205,582 B1 | 3/2001 | Hoarty |
| 6,209,130 B1 | 3/2001 | Rector et al. |
| 6,219,042 B1 | 4/2001 | Anderson et al. |
| 6,230,319 B1 | 5/2001 | Britt, Jr. et al. |
| 6,233,546 B1 | 5/2001 | Datig |
| 6,233,592 B1 | 5/2001 | Schnelle et al. |
| 6,237,022 B1 | 5/2001 | Bruck et al. |
| 6,240,555 B1 | 5/2001 | Shoff et al. |
| 6,253,238 B1 | 6/2001 | Lauder et al. |
| 6,275,989 B1 | 8/2001 | Broadwin et al. |
| 6,295,058 B1 | 9/2001 | Hsu et al. |
| 6,301,584 B1 | 10/2001 | Ranger |
| 6,308,206 B1 | 10/2001 | Singh |
| 6,327,574 B1 | 12/2001 | Kramer et al. |
| 6,338,094 B1 | 1/2002 | Scott et al. |
| 6,340,624 B1 | 1/2002 | Doan et al. |
| 6,345,292 B1 | 2/2002 | Daugherty et al. |
| 6,357,042 B2 | 3/2002 | Srinivasan et al. |
| 6,363,525 B1 | 3/2002 | Dougherty et al. |
| 6,373,609 B1 | 4/2002 | Mizrahi |
| 6,415,303 B1 | 7/2002 | Meier et al. |
| 6,424,717 B1 | 7/2002 | Pinder et al. |
| 6,430,624 B1 | 8/2002 | Jamtgaard et al. |
| 6,446,261 B1 | 9/2002 | Rosser |
| 6,457,103 B1 | 9/2002 | Challenger et al. |
| 6,459,427 B1 | 10/2002 | Mao et al. |
| 6,460,180 B1 | 10/2002 | Park et al. |
| 6,471,392 B1 | 10/2002 | Holl et al. |
| 6,473,609 B1 | 10/2002 | Schwartz et al. |
| 6,473,858 B1 | 10/2002 | Shimomura et al. |
| 6,496,981 B1 | 12/2002 | Wistendahl et al. |
| 6,510,557 B1 | 1/2003 | Thrift |
| 6,513,019 B2 | 1/2003 | Lewis |
| 6,513,160 B2 | 1/2003 | Dureau |
| 6,515,349 B2 | 2/2003 | Terashima |
| 6,516,349 B1 | 2/2003 | Lieberman |
| 6,518,950 B1 | 2/2003 | Dougherty et al. |
| 6,536,041 B1 | 3/2003 | Knudson et al. |
| 6,542,593 B1 | 4/2003 | Bowman-Amuah |
| 6,546,488 B2 | 4/2003 | Dillion et al. |
| 6,547,754 B1 | 4/2003 | Evans et al. |
| 6,564,251 B2 | 5/2003 | Katariya et al. |
| 6,564,263 B1 | 5/2003 | Bergman et al. |
| 6,571,392 B1 | 5/2003 | Zigmond et al. |
| 6,574,793 B1 | 6/2003 | Ngo et al. |
| 6,574,795 B1 | 6/2003 | Carr |
| 6,577,346 B1 | 6/2003 | Perlman |
| 6,584,153 B1 | 6/2003 | Gordon et al. |
| 6,601,103 B1 | 7/2003 | Goldshmidt Iki et al. |
| 6,614,914 B1 | 9/2003 | Rhoads et al. |
| 6,615,408 B1 | 9/2003 | Kaiser et al. |
| 6,637,032 B1 | 10/2003 | Feinleib |
| 6,640,145 B2 * | 10/2003 | Hoffberg et al. ................. 700/83 |
| 6,643,652 B2 | 11/2003 | Helgeson et al. |
| 6,651,218 B1 | 11/2003 | Adler et al. |
| 6,654,754 B1 | 11/2003 | Knauft et al. |
| 6,668,378 B2 | 12/2003 | Leak et al. |
| 6,675,350 B1 | 1/2004 | Abrams et al. |
| 6,676,350 B1 | 1/2004 | McSherry et al. |
| 6,698,020 B1 | 2/2004 | Zigmond et al. |
| 6,698,023 B2 | 2/2004 | Levitan |
| 6,718,551 B1 | 4/2004 | Swix et al. |
| 6,725,461 B1 | 4/2004 | Dougherty et al. |
| 6,735,487 B1 | 5/2004 | Marshall et al. |
| 6,742,043 B1 | 5/2004 | Moussa et al. |
| 6,745,368 B1 | 6/2004 | Boucher et al. |
| 6,750,919 B1 | 6/2004 | Rosser |
| 6,756,997 B1 | 6/2004 | Ward, III et al. |
| 6,779,154 B1 | 8/2004 | Nussbaum et al. |
| 6,792,616 B1 | 9/2004 | Jerding et al. |
| 6,799,326 B2 | 9/2004 | Boylan, III et al. |
| 6,799,327 B1 | 9/2004 | Reynolds et al. |
| 6,826,597 B1 | 11/2004 | Lonnroth et al. |
| 6,839,903 B1 | 1/2005 | Shintani et al. |
| 6,847,969 B1 | 1/2005 | Mathai et al. |
| 6,925,595 B1 * | 8/2005 | Whitledge et al. ............ 715/234 |
| 6,934,963 B1 | 8/2005 | Reynolds et al. |
| 6,938,270 B2 | 8/2005 | Blackketter et al. |
| 7,028,327 B1 | 4/2006 | Dougherty et al. |
| 7,062,777 B2 | 6/2006 | Alba et al. |
| 7,079,176 B1 | 7/2006 | Freeman et al. |
| 7,080,039 B1 | 7/2006 | Marsh |
| 7,100,183 B2 | 8/2006 | Kunkel et al. |
| 7,103,605 B1 | 9/2006 | Hazi et al. |
| 7,103,904 B1 | 9/2006 | Blackketter et al. |
| 7,143,042 B1 | 11/2006 | Sinai et al. |
| 7,222,163 B1 * | 5/2007 | Girouard et al. .............. 709/219 |
| 7,287,018 B2 | 10/2007 | Lennon |
| 7,500,188 B1 | 3/2009 | Trapani et al. |
| 7,650,376 B1 | 1/2010 | Menau |
| 2001/0003212 A1 | 6/2001 | Marler et al. |
| 2001/0011265 A1 | 8/2001 | Cuan et al. |
| 2001/0027491 A1 | 10/2001 | Terretta et al. |
| 2001/0037500 A1 | 11/2001 | Reynolds et al. |
| 2001/0051031 A1 | 12/2001 | Hada et al. |
| 2001/0054031 A1 | 12/2001 | Lee et al. |
| 2002/0011265 A1 | 1/2002 | Ganachaud |
| 2002/0046237 A1 | 4/2002 | Yokokura |
| 2002/0046273 A1 | 4/2002 | Lahr et al. |
| 2002/0104086 A1 | 8/2002 | Tomsen et al. |
| 2002/0131511 A1 | 9/2002 | Zenoni |
| 2002/0184627 A1 | 12/2002 | Alba et al. |
| 2003/0023971 A1 | 1/2003 | Martinolich et al. |
| 2004/0006747 A1 | 1/2004 | Tyler |
| 2004/0133910 A1 | 7/2004 | Gordon et al. |
| 2005/0114757 A1 | 5/2005 | Sahota et al. |
| 2005/0193410 A1 | 9/2005 | Eldering |
| 2006/0130120 A1 | 6/2006 | Brandyberry et al. |
| 2006/0168624 A1 | 7/2006 | Carney et al. |
| 2007/0091919 A1 | 4/2007 | Sandoval |
| 2009/0217329 A1 | 8/2009 | Riedl et al. |
| 2010/0215340 A1 | 8/2010 | Pettit et al. |
| 2010/0268773 A1 | 10/2010 | Hunt et al. |

OTHER PUBLICATIONS

International Search Report for nternational Application No. PCTIUS01113243 (Metatv, Inc.) dated Oct. 10, 2001.

International Search Report for International Application No. PCTIUS01/13241 (Metatv, Inc.), dated Sep. 10, 2001.

"Advanced Television Enhancement Forum Specification (ATVEF)", ATVEF, 34 pages, Feb. 2, 1999.

(56) References Cited

OTHER PUBLICATIONS

International Preliminary Examination Report, PCT/US01/13244, mailed Feb. 18, 2003 (11 pages).
Barta, Robert, et al, "Syndication with JML", Proceedings of the 2000 ACM Symposium on Applied Computing—vol. 2, ACM Press, Mar. 2000, pp. 962-970.
Kuchling, Andrew, "XML, the eXtensible Markup Language", Linux Journal, Specialized Systems Consultants, Inc., Nov. 1998, pp. 1-3.
Smith, John R., et al. "Scalable Multimedia Delivery for Pervasive Computing", Proceedings of the Seventh ACM International Conference on Multimedia (Part 1), Oct. 1999, pp. 131-140.
"Spyglass Prism: Concepts and Applications", Spyglass Inc, 1997, pp. 1-10.
"XHTML 1.0: The Extensible HyperText Markup Language, A Reformulation of HTML 4.0 in XML 1.0", www.w3.org, downloaded from http://www.w3.org/TR/1999/WD-html-in-xml-19990224/,pp. 1-15.
Microsoft Computer Dictionary, Third Edition, Microsoft Press, 1997, p. 368.
"Office Action dtd Dec. 7, 2006, U.S. Appl. No. 11/022,898, filed Dec. 22, 2004".
"Office Action dtd Jun. 29, 2007, U.S. Appl. No. 11/022,898, filed Dec. 22, 2004".
"Office Action dtd May 5, 2005, U.S. Appl. No. 11/022,899, filed Dec. 22, 2004".
"Office Action dtd Oct. 25, 2005, U.S. Appl. No. 11/022,899, filed Dec. 22, 2004".
"Office Action dtd Jul. 7, 2006, U.S. Appl. No. 11/022,899, filed Dec. 22, 2004".
"Office Action dtd Dec. 12, 2006, U.S. Appl. No. 11/022,899, filed Dec. 22, 2004".
"Office Action dtd Jan. 17, 2008, U.S. Appl. No. 11/022,899, filed Dec. 22, 2004".
"Office Action dtd Jul. 10, 2008, U.S. Appl. No. 11/022,899, filed Dec. 22, 2004".
"Microsoft Computer Dictionary," Microsoft Press, Third Ed., 1997, p. 505.
Arens, Y. et al., "Intelligent Caching: Selecting, Representing, and Reusing Data in an Information Server," Proc. of the Third International Conf. on Information and Knowledge Management, Nov. 1994, pp. 433-438.
Bayardo, R. et al., "InfoSleuth: Agent-Based Semantic Integration of Information in Open and Dynamic Environments," ACM SIGMOD Record, Jun. 1997, vol. 26, Issue 2, pp. 195-206.
Bulterman, D., "Embedded Video in Hypermedia Documents: Supporting Integration and Adaptive Control," ACM Transactions on Information System (TOIS), Oct. 1995, vol. 13, Issue 4, pp. 440-470.
Calvary, G. et al., "From Single-User Architectural Design to PAC: a Generic Software Architecture Model for CSCW," Proc. of the SIGCHI Conf. on Human Factors in Computer Systems, Mar. 1997, pp. 242-249.
Claypool K. et ak,m :OQL__SERF: An ODMG implementation of the Template-Based Scheme Evolution Framework, Proc. of the 1998 Conf. of the Centre for Advanced Studies on Collaborative Research, Nov. 1998, pp. 1-15.
Ensink, B. et al, "XML Based Adaptation of the Composite Approach for Database Integration", Proceedings of the 37th Annual Southeast Regional Conference (CD-ROM), Apr. 1999, pp. 1-6.
Fraïssé, S. et al. "Generating hypermedia from specifications by sketching multimedia templates," In Proceedings of the Fourth ACM international Conference on Multimedia (Boston, MA, Nov. 18-22, 1996). Multimedia '96. ACM, New York, NY, 353-364.
Glushko, R. et al, "An XML Framework for Agent-Based E-Commerce", Communications of the ACM, vol. 42, No. 3, Mar. 1999, pp. 106-114.
Hijiri, T. et al, "A Spatial Hierarchical Compression Method for 3D Streaming Animation", Proceedings of the Fifth Symposium on Virtual Reality Modeling Language (Web3D-VRML), Feb. 2000, pp. 95-101.
Iyengar A. et al., "Improving Web Server Performance by Caching Dynamic Data," In Proceedings of the USENIX Symposium on Internet Technologies and Systems, Dec. 1997, pp. 1-13.
Puder, A. et al, "Position Papers: System Support for Knowledge-Based Trading in Open Service Markets", Proceedings of the 7th Workshop on ACM SIGOPS European Workshop: Systems Support for Worldwide Applications, Sep. 1996, pp. 289-296.
Puerta, A. et al, "Towards a general computational framework for model-based interface development systems," In Proceedings of the 4th International Conference on Intelligent User interfaces (Los Angeles, CA, Jan. 5-8, 1999). IUI '99. ACM, New York, NY, 171-178.
Shim, S. et al., "Template Based Synchronized Multimedia Integration Language Authoring Tool," SPIE Conference on Internet Imaging, Dec. 1999, vol. 3964, pp. 134-142.
Spencer, Ken, "Using XML to Build Internet Solutions", Windows IT Pro, http://www.winntmag.com/Articles/Print.cfm?ArticleID=5056, Apr. 1999.
Wegner, L. et al, "Applications: A Visual Interface for Synchronous Collaboration and Negotiated Transactions", Proceedings of the Workshop on Advanced Visual Interfaces, May 1996, pp. 156-165.
Palmer, J. W. and Eriksen, L. B. 1999. Digital newspapers explore marketing on the Internet. Commun. ACM 42, 9 (Sep. 1999), 32-40.
Hodes, T. D. and Katz, R. H. 1999. Composable ad hoc location-based services for heterogeneous mobile clients. Wirel. Netw. 5, 5 (Oct. 1999), 411-427.
U.S. Appl. No. 10/410,023, Non-Final Office Action mail date Dec. 29, 2008.
U.S. Appl. No. 10/410,023, Non-Final Office Action mail date Oct. 31, 2007.
U.S. Appl. No. 10/410,023, Non-Final Office Action mail date Sep. 22, 2006.
U.S. Appl. No. 10/410,023 Final Office Action mail dated Jun. 19, 2008.
U.S. Appl. No. 10/410,023 Final Office Action mail dated Mar. 22, 2007.
U.S. Appl. No. 12/684,439 Non-Final Office Action mail date Nov. 23, 2010.
US 6,542,592, 7/2002, Beebe et al. (withdrawn).
Morris S: "The MHP Tutorial", Internet Citation, 2002, XP002281053, retrieved from the Internet: URL: http://www.mhp-interactive.org/tutorials/mhp/printerfriendly/ (retrieved on May 19, 2004).
Extended European Search Report—EP12181319—Mailing date: Dec. 19, 2012.
Steinhorn, Jason and Mark Kohler. "Enhancing TV With ATVEF" Embedded Systems Programming, Oct. 1999, pp. 55-64.

\* cited by examiner

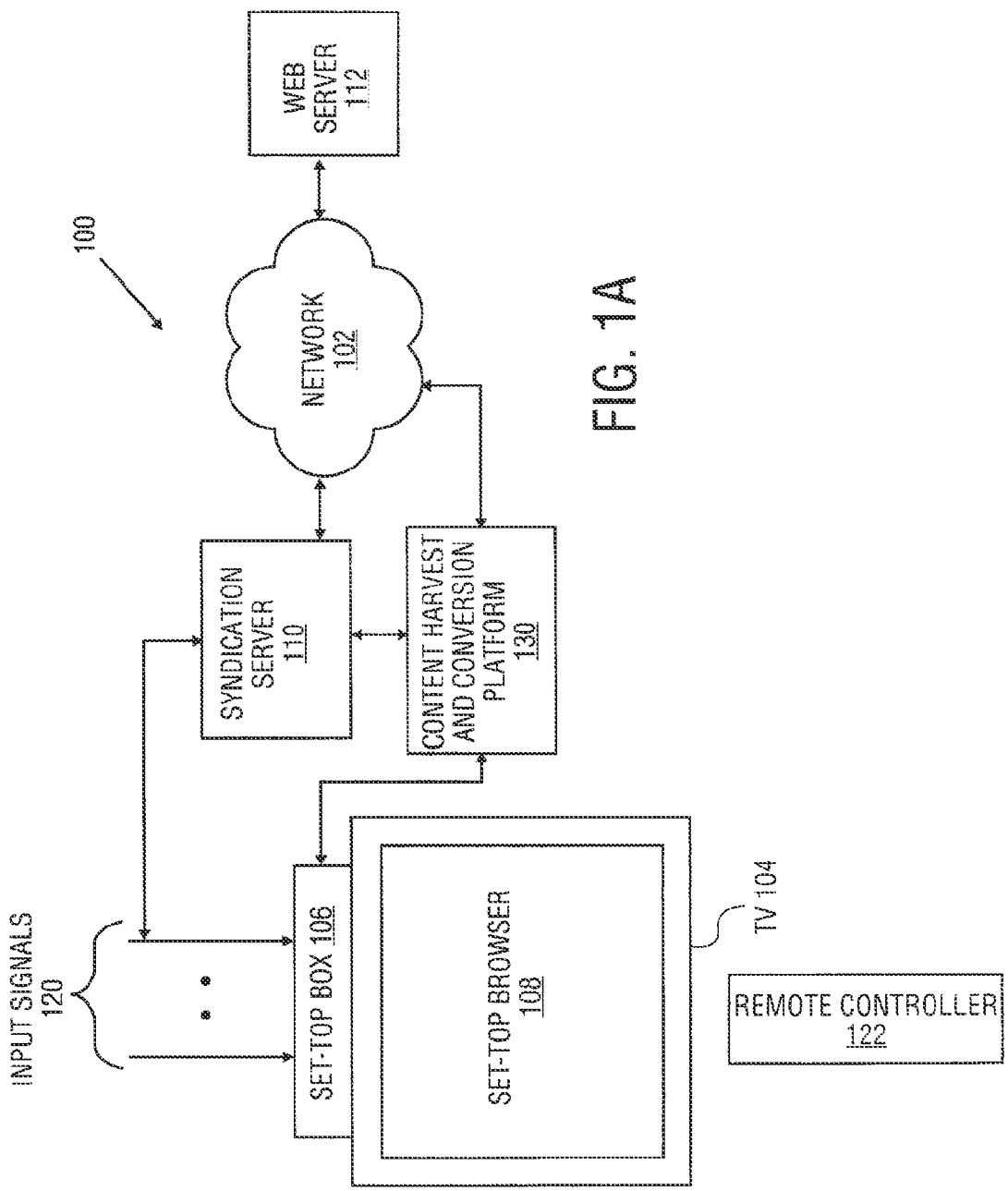

METHOD AND SYSTEM FOR TRANSFORMING CONTENT FOR EXECUTION ON MULTIPLE PLATFORMS

RELATED APPLICATION

The present application is a Continuation of U.S. patent application Ser. No. 11/023,178, filed Dec. 22, 2004, which is a Divisional of U.S. patent application Ser. No. 09/841,017, filed Apr. 23, 2001, now U.S. Pat. No. 7,702,995, issued Apr. 20, 2010, which claims priority to U.S. Provisional Application No. 60/199,686, filed on Apr. 24, 2000. All prior patent applications are hereby incorporated by reference in their entirety.

FIELD OF THE INVENTION

The present invention relates generally to field of information and data processing. More particularly, the present invention relates to content syndication and transformation for multiple platforms. Specifically, the present invention relates to a method and system for designing and transforming content for execution on multiple platforms.

BACKGROUND OF THE INVENTION

Syndication is a process of gathering information from a range of sources and repackaging the information for access and display at a destination. Syndication is popular with interactive television (iTV) environments. In an iTV environment, a TV user can interact with a broadcast or service being provided on the TV. A well-known iTV syndication service is WebTV. WebTV provides a service through a set-top box such that a user can access content (e.g., a web page) on the Internet or World Wide Web via a remote controller and a browser operating on the TV.

Typically, a web page includes Hyper Text Markup Language (HTML) tags and attributes for displaying text and images designed for a web browser on a personal computer. To display a web page for the TV, however, WebTV uses a transcode server that applies a simple, generic or blind mapping of the HTML tags and attributes for the web page and targets it specifically for its own browser provided by its own set-top box. Basically, WebTV corrects elements of the web page for display on the TV. For example, the WebTV transcode server will perform a simple mapping of an object (e.g., changing the object size) to fit on the TV.

Thus, a disadvantage of using WebTV is that the generic mapping or blind transformation process does not account for certain drawbacks of displaying Internet content in the TV environment such as, for example, low-resolution of graphics, lack of support of several web languages, and lack of support for a mouse navigation interface. Another disadvantage of WebTV is that it does not provide for multiple platform use. Instead, WebTV can only be used with its own WebTV set-top box. Furthermore, WebTV does not allow for alteration or modification of content such that new look and feel content can be provided to the user. That is, new media content cannot be inserted along with existing content for display.

Current syndication technologies, which do enable the creation of HTML-enhanced TV content, require providers of the HTML content to re-implement or re-code the HTML content for use on different types of platforms. For example, if HTML content on the Internet is to be provided to a wireless device (e.g., a wireless telephone), the HTML content must be re-coded in a wireless markup language (WML). Such a re-coding process exacts a heavy burden on content providers to have their content accessible by different types of devices.

Current syndication technologies also do not provide a simple manner to navigate, acquire, and convert a given web page for a TV centric environment. Consequently, existing technologies that convert content from one form to another require manual hard coding of the navigation, acquisition, and transformation process. That is, each web page must be coded for the entire system and must be manually maintained and updated. Furthermore, current syndication technologies are not designed to accommodate conversion of the content into new languages for different devices and content formats.

SUMMARY OF THE INVENTION

A method and system are disclosed for acquiring and transforming existing content (e.g., Hyper Text Markup Language HTML content) for display and execution on multiple platforms and architectures. In one embodiment, capture templates are created to harvest content from disparate content sources on multiple platforms. Data is extracted from the content from the disparate content sources using the created capture templates that drives extracting process. A standardized data stream is generated from the extracted data. The standardized data stream is provided for display on one or more different type of platforms.

Other features and advantages of the present invention will be apparent from the accompanying drawings, and from the detailed description, which follows below.

BRIEF DESCRIPTION OF THE DRAWINGS

The present invention is illustrated by way of example, and not limitation, in the figures of the accompanying drawings in which like reference numerals refer to similar elements and in which:

FIG. 1A illustrates an exemplary syndication system in which the present invention can be implemented;

DETAILED DESCRIPTION

Figure 1B:
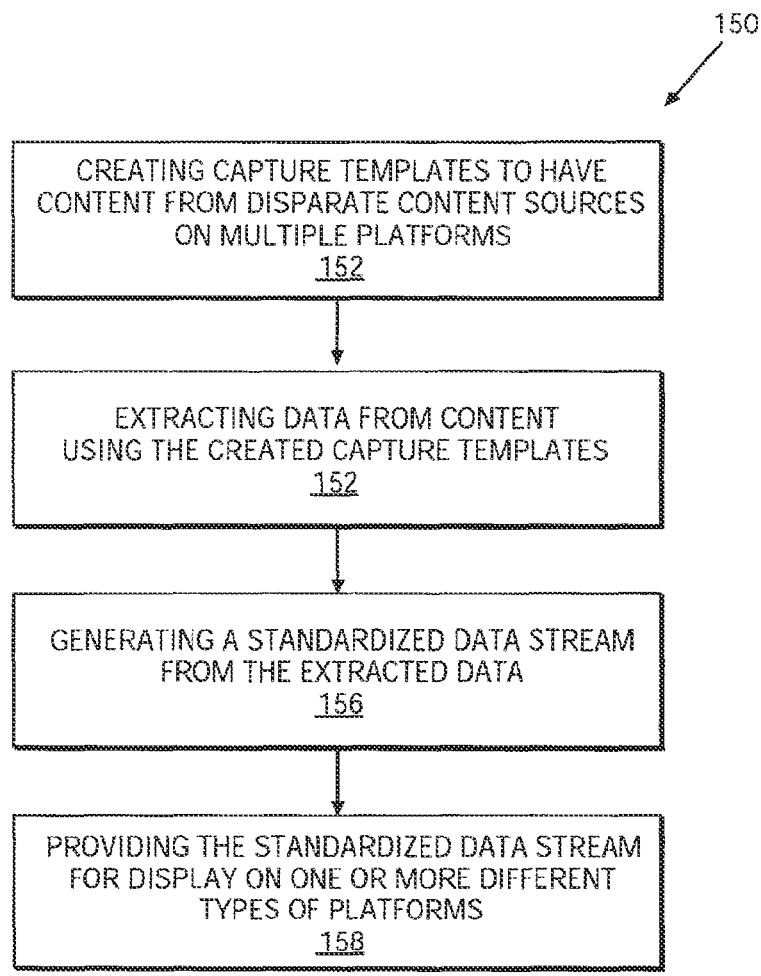
FIG. 1B illustrates a flow chart of a basic syndication operation according to one embodiment.

A method and system are described for acquiring and transforming existing content (e.g., Hyper Text Markup Language HTML content) for display and execution on multiple platforms and architectures. In one embodiment, capture templates are created to harvest content from disparate content sources on multiple platforms. Data is extracted from the content from the disparate content sources using the created capture templates that drives extracting process. A standardized data stream is generated from the extracted data. The standardized data stream is provided for display on one or more different type of platforms.

By generating a standardized data stream from the capture templates, content can be displayed on multiple types of platforms. The capture templates are platform neutral and allow content to be portable on or more different types of platforms. The capture templates are used to transform content for different types of devices. Thus, by using such capture templates, content does not have to be re-coded for each specific type of device or platform.

In one embodiment, a capture template is an Extensible Markup Language (XML) file or document that is created by extracting data from HTML content. The XML file allows for portability of data across multiple platform types. Because XML is extensible, content can be defined in a number of ways for many different purposes. Thus, new "look and feel" content can be created. In one embodiment, a simple to use template authoring tool allows XML files to be created by selectively navigating and extracting data from HTML content. The template authoring tool enables a user to create XML files or documents without having to perform hard XML coding.

In the following embodiments, a single platform can be used to acquire content in one format and to transform the content in a format suitable for any number of destination devices. Furthermore, the following embodiments describe simple to use application tools for acquiring content and for creating templates to transform the content. The templates can be stored in a file or a database for later, which allows content to be edited such that other types of content can be added to provide new "look and feel" content.

In the following embodiments, syndication processing techniques are described in connection with an iTV centric environment. However, the syndication processing techniques described herein are not intended to be limited to the iTV centric environment and can easily be implemented for other types of environments, such as, for example, personal computer devices and mobile or electronic portable devices including wireless telephones, pagers, personal digital assistants (PDAs), Internet-accessible electronic devices, or other like devices.

The syndication processing techniques described herein can be implemented by a processor or central processing unit (CPU) executing code or instructions stored in a machine-readable medium. The machine-readable medium may include a mechanism that provides (i.e., stores and/or transmits) information in a form readable by a machine such a processor, computer, or a digital processing device. For example, a machine-readable medium may include a read only memory (ROM), random access memory (RAM), magnetic disk storage media, optical storage media, or flash memory devices. The code or instructions can be represented by carrier wave signals, infrared signals, digital signals, and by other like signals.

Multiple Platform Syndication
Exemplary Syndication System

FIG. 1 illustrates an exemplary syndication system 100 in which the present invention can be implemented. Referring to FIG. 1, exemplary syndication system 100 includes a set-top box 106 connected to a TV 104. Set-top box 106 and TV 104 can receive inputs from a remote controller 122. TV 104 is shown to have a network 102 connection capability. That is, TV 104 can be connected to network 102 via set-top box 106. In particular, TV 104 can receive content (e.g., a web page) from a web server 112 connected to network 102. Set-top box 106 can be connected to network 102 through syndication server 110 and/or conversion harvest and conversion platform 130.

In one embodiment, network 102 is the Internet hosting the World Wide Web (WWW). The WWW allows for a uniform way of accessing information on the Internet using HTML compliant browsers. Network 102 can be other types of networks such as, for example, a local area network (LAN) or a wide area network (WAN). Network 102 can also represent wired or wireless networks. Although one web server 102 is shown in FIG. 1, any number of web servers can be connected to network 102. Furthermore, other types of network devices can also be connected to network 102, which can provide content for TV 104, such as, for example, a network router, bridge, gateway, or other like network devices.

Set-top box 106 is a receiver for TV 104. Set-top box receives input signals 120 (e.g., television signals) to display on TV 104. Input signals 120 can be broadcast signals from a plurality of programming sources. For example, set-top box 106 can receive broadcast signals as input signals 120 from an antenna, cable, or satellite source. Input signals 120 can be analog or digital signals. Set-top box 106 can provide on-screen displays (OSDs) or graphical user interfaces (GUIs) to facilitate interactive services, e.g., accessing content on the Internet. As shown in FIG. 1, set-top box 106 provides a set-top browser 108 such that a user of remote controller 122 can control set-top browser 108 to access a web page from a web server 102 connected to network 102. In an alternative embodiment, remote controller 122 can be replaced with an infrared (IR) keyboard.

Syndication server 110 is a processing device, which can acquire content from a range of sources on network 102 and repackage the content for set-top box 106. Alternatively, syndication server 110 can be hardware and/or software modules operating within set-top box 106 to syndicate content from network 102 for set-top box 106. Syndication server 110 can also transform content, e.g., a web page on web server 112, to be displayable for an application, e.g., set-top browser 108, running on TV 104.

In one embodiment, syndication server 110 transforms an HTML web page into an XML file or document ("XML file"). The XML file can be transformed for multiple types of platforms. For example, syndication server 110 can generate a standardized data stream from the XML file for display on multiple types of platforms or formats such as, for example, HTML, portable document format (PDR), Postscript, or other like formats. In one embodiment, syndication server 110 can incorporate enhanced Internet content with input signals 120 such that the enhanced content is targeted for set-top box 106. In other embodiments, syndication server 110 can transform content on network 102 and target the content for other types of devices such as, for example, a personal computer or an electronic portable device.

Content harvest and conversion platform 130 is a processing system, which can harvest content on network 102 and provide frameworks and templates for the content usable by syndication server 102. Alternatively, content harvest and conversion platform 130 can be hardware and/or software modules operating within syndication server 110 or set-top box 106 to harvest and transform content on network 102. In one embodiment, content harvest and conversion platform 130 is used to harvest and parse an HTML web page into an XML file.

The XML file can include any number of templates with new content and media added. For example, an HTML web page is parsed, and selected tags, styles, and content can either be replaced or removed thereby creating new content from the original HTML web page. Thus, if a user wants to access a particular web page on web server 112, content harvest and conversion platform 130 can have predefined templates for that web page such that syndication server 110 will provide the web page to set-top box 106 using the predefined templates. The internal operation and subsystems of content harvest and conversion platform 130 will be explained in further detail below.

Remote controller 122 is a control device for a user to provide inputs (e.g., infrared (IR) or radio frequency (RF) signals) to set-top box 106 and/or TV 104. Remote controller 122 can include alphanumeric keys, options keys, functions keys, and other like keys to operate set-top box 106 or TV 104. In particular, a user can access and navigate through set-top browser 108 on TV 104 by pressing selectively certain buttons or keys on remote controller 122. Exemplary syndication system 100 can also be implemented in numerous configurations. For example, TV 104 can have the functionality of set-top box 106 contained internally. TV 104 can also be a computing device, which can display television signals. Furthermore, the functionality of syndication server 110 and content harvest platform 130 can be separate computing devices or hardware and software modules operating within set-top box 106.

Basic Syndication Operation

FIG. 1B illustrates a flow chart of a basic syndication operation 150 according to one embodiment. Referring to FIG. 1B, operation 150, begins at operation 152.

At operation 152, capture templates are created to harvest content from disparate content sources on multiple platforms. For example, content harvest and conversion platform 130 provides the facilities and mechanisms to create capture templates and to harvest the content. The content can be from web page on web server 112. The web page can include HTML tags and attributes to display text and images for a personal computer display.

In one embodiment, content harvest and conversion platform 130 is used to create templates as XML files. Thus, various types of templates can be created for different types of devices because XML allows content of data to be defined in a variety of ways. In one embodiment, content and harvest conversion platform 130 can be used to create templates for a mobile device such as, for example, a wireless telephone or personal data assistant (PDA). Content and harvest conversion platform 130 can also store the templates in repositories for later use. The templates can be created that adds new content to create new "look and feel" environments as will be explained in further detail below.

At operation 154, data from the content is extracted using the created capture templates. For example, content harvest and conversion platform 130 can be used to extract pure data can be extracted from the web page such as, for example, the HTML tags and attributes.

At operation 156, a standardized data stream is generated using the extracted data. For example, content harvest and conversion platform 130 can be used to generate the standardized data stream (e.g., an XML data stream). The standardized data stream can be sent to syndication server 110.

At operation 158, the standardized data stream is provided for display on one or more different types of platforms. For example, syndication server 110 can deliver the standardized data stream to set-top box 106. Set-top box 106 can then direct the standardized data stream for display via set-top browser 108 operating on TV 104.

In one embodiment, a user can request access to a web page from web server 112. The request can be processed by syndication server 110. Syndication server 110 can request a standardized data stream for the web page from content harvest and conversion platform 130. Content harvest and conversion platform 130 can provide the standardized data stream to syndication server 110 using the capture templates as will be described in more detail below. Syndication server 110 can then send the standardized data stream to set-top box 106 for display. Syndication server is thus able to deliver content designed for a computer display to a TV display.

Syndication Server and Content Harvest and Conversion Platform Architecture

Figure 2A:
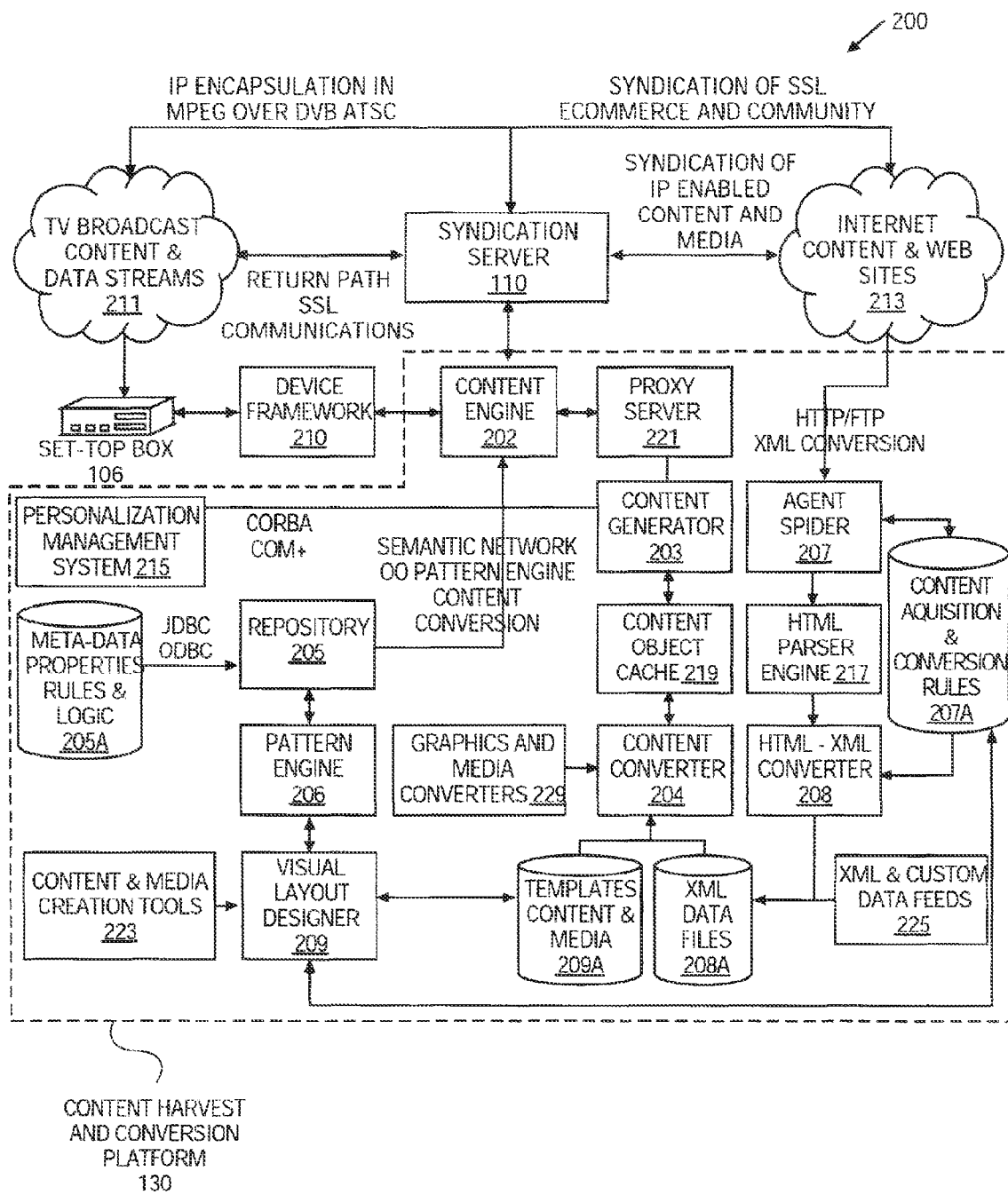
FIG. 2A illustrates a syndication server and content harvest and conversion platform architecture according to one embodiment.

FIG. 2 illustrates a syndication server and content harvest and conversion platform architecture 200 according to one embodiment. Referring to FIG. 2, exemplary architecture 200 provides details of the subsystems for content harvest and conversion platform 130. The subsystems can be hardware and/or software modules to transform content from one platform to be executable on multiple platforms.

Syndication server 110 is responsible for the overall management of the system within exemplary architecture 200. In particular, syndication server 110 controls content flow to set-top box 106. Syndication server 110 can also control content flow to other types of devices, e.g., a PDA or a wireless telephone. Syndication server 110 can also coordinate client requests, content delivery, and commerce transactions that may be initiated, e.g., by a user of TV 104. Syndication server 110 interfaces with TV broadcast content and data streams 211. TV broadcast and data streams 211 provide feeds into set-top box 106 for TV 104. TV 104 can be a TV system supporting analog, Digital Video Broadcasting (DVB), Advanced Television Systems Committee (ATSC), or other well known TV standards. In one embodiment, syndication server 110 can inject Internet Protocol (IP) based data into TV broadcast content and data streams 211 going to set-top box 106. For example, syndication server 110 can combine Internet content with TV broadcast content and data streams 211 using the Advanced Television Enhancement Forum (ATVEF) standard. ATVEF is standard to provide web-based content in a TV broadcast.

Syndication server 110 also interfaces with Internet content and web sites 213, which can be accessible by standard compliant browsers. Syndication server 110 can combine the ability to broadcast content and the ability to request content to create new personalized experiences. For example, syndication server 110 can add new content to a web page being sent to set-top box 106. That is, syndication server 110 can retrieve harvested content and combine a variety of new content types with the data broadcast to provide a "new look and feel" to the content. Syndication server 110 uses content engine 202 to create synthesized content. Syndication server 110 can target the synthesized content for various types of platforms, devices, and audiences.

Syndication server 110 can perform syndication on-the-fly in response to a user's request of TV 104. Syndication server 110 can also be programmed to perform scheduled syndication of content to the user. In one embodiment, syndication server 110 is to operate using Java Script Pages (JSP), Java and Enterprise Java Beans (EJB) to convert standardized content data stream to other optimized formats for various types of platforms, devices, and audiences. In another embodiment, syndication server 110 is to operate using an open standard, which includes the XML standard. In other embodiments, syndication server 110 is to operate using standard XML applications, which include Extensible Style Sheet Language Transformation (XSLT), XML path language (XPATH), World Wide Web Consortium (W3C) Document Object Model (DOM) Application Program Interface (API), or other like standards. Such XML applications will be described in further detail below. Furthermore, all syndication modules within syndication server 110 can be packaged as enterprise java beans (EJB), which allows the modules to run within an EJB compliant application servers. An EJB compliant application server provides an architecture for the development and deployment of distributed object systems for the Java platform. Applications written using the EJB architecture are scalable, transactional, and multi-user secure.

Content engine 202 is responsible for creating and delivering content and media assets to device framework 210. Content engine 210 uses a repository 205 storing meta data properties, rules, and logic 205a and content generator 203 via proxy server 221 to provide a dynamic and compelling targeted service to set-top box 106 or for other devices. Content engine 202 can provide a service that is easy to update and change.

Content engine 202 manages localization and personalization of content and media assets for geographic and demographic targeting. In one embodiment, content engine 202 leverages existing algorithms for collaborative filtering and personalization by exposing meta data, properties, rules, and logic 205a in repository 205 with external personalization management system 215.

Content engine 202 dynamically composes content, scripts, and media for syndication server 110. Content engine 202 can also generate code or instructions, which are industry standard compliant, to exploit specific platforms and devices. For example, content engine 202 can convert an HTML web page into an XML file. Content engine 202 can use extensive routines and libraries provided by device framework 210 to deliver a highly scalable environment. Content engine 202 can be used to customize the content for geographic and demographic integration into the data broadcast, which provides instant, responsive, and compelling experiences for the end user.

Content generator 203 is responsible for producing well formed HTML, XML, JavaScript, Java, custom code and other media formats for targeting content to specific platforms and devices. Content generator 203 uses meta data, properties, rules, and logic 205a with templates, content, and media 209a and XML data files 208a to generate content for delivery to content engine 202. Content generator 203 uses content converter 204 and content acquisition system ("Agent Spider") 207 to locate, harvest, convert and deliver existing Internet content for new interactive services. For example, the Internet content can be HTTP, file transfer protocol (FTP), or XML content, which is to be converted. In one embodiment, the Internet content is to be converted to an XML file.

Content generator 203 uses templates, content, and media 209a and repository 205 storing meta data, properties, rules, and logic 205a to resolve object properties and design information. The meta data drives the generation process to be highly targeted and adapted for specific devices and users. Content generator 203 can use an external content object cache 219 to optimize the delivery of previously composed and loaded content. Content object cache 219 is loaded dynamically and optimized to combine broadcasted content.

Content Converter 204 is responsible for transforming, e.g., XML data files 208a or other type of media, to new formats using templates, content, and media 209a. Content converter 204 manages and coordinates existing conversion tools and libraries to transform content. The templates and conversion rules are stored as templates, content, and media 209a that is populated by the visual layout designer 209. A user can operate visual layout designer 209 to create templates to describe how content should be laid out and what interface model and logic should be applied. XML data files 208a are used to access service data and information that is combined with media, content, and script files. Each XML file type and content type are tagged with meta data to allow for fine tuned delivery of specific versions, file sizes, color depths, visual style, and audio quality. In one embodiment, content converter 203 transforms assets dynamically (with caching). In another embodiment, content converter 203 can be scheduled in a batch mode other types of services.

Repository 205 is a semantic network based data store of all objects and properties of the overall content syndication system 200. Repository 205 can be one or more memory devices (e.g., a fixed disk) to store a database of meta data, repositories, rules, and logic 205a. In one embodiment, repository 205 uses an object, fact and value based meta data model to store meta data information about design objects and properties. In one embodiment, repository 205 provides data to allow a semantic network based approach with a flexible verb table driven meta model, which allows any information to be captured, versioned, catalogued, indexed and queried. Repository 205 can store screen designs, templates, business logic and conversion rules for content delivery to a variety of execution environments.

Repository 205 can use a database to store meta data, properties, rules, and logic 209a. Repository 205 can be used to provide a lazy on demand loading ability to load an object's facts and properties. Repository 205 has the ability to store variants, stacked configurations, and language filtering to make storage of multiple versions of applications and content to be cost effective and very efficient. Repository 205 uses pattern engine 206 to provide projected views of the meta data to allow resolution of facts for composing object containments, collaborations, and properties. Pattern engine 206 is used to fully resolve across platform types, variants and locales and provides an elegant way to store and view multiple versions of the same service.

Pattern Engine 206 is tightly integrated with the repository 205, but requires special attention as it provides the algorithm and meta model to enable large-scale reuse of complete architectures, interface models, and personalization logic from existing designs. Pattern engine 206 takes into account existing proven system architectures and pre-build components and applies domain and platform specific modifications to create dynamic, customized version of each interactive service. Pattern engine 206 is used by repository 206 to provide "projections" of the design information for a specific configuration. Pattern engine 206 uses advanced object oriented inheritance and semantic network taxonomy algorithms to provide an easy to use abstraction of the service for professional creative and business users.

Agent Spider 207 is responsible for rapidly accessing content, media and programming from existing Internet content and web sites 213. Agent spider 207 is able to understand the structure of a web site, and relevant web pages on any site and harvest the content from the site. Agent spider 207 can be used to schedule periodic batch runs or accessed in real time to satisfy client requests for content. Agent spider 207 stores content acquisition and conversion rules in a repository 207a and employs advanced algorithms to navigate a web site's structure and locate a particular uniform resource instruction (URI) to extract information, content and media assets without any changes to existing web sites and pages.

Agent spider 207 accesses content using Internet standard protocols such as HTTP/HTTPS/FTP and other platform specific APIs. Agent spider 207 uses existing standard HTML parser engine 217 to read and transform the structure and content of any given page. The content acquisition subsystem of the agent spider is flexible and new acquisition modules can be easily plugged in. Agent spider 207 is able to locate, acquire and convert content dynamically in real time in a highly scalable manner. Agent spider 207 is capable of advanced agent behavior including responding to events, site changes and transactions from existing sources. Agent spider 207 is able to acquire content that requires security and authorization including secure sockets layer (SSL).

HTML converter 208 converts existing HTML type content into clean well-formed documents (xHTML) for conversion into XML service specific schemas and data files. An XML schema offers an XML centric means to constrain XML documents. The conversion logic and process is stored in a content acquisition and conversion rules repository 207*a*. HTML converter 208 creates XML data files 208*a* based on the conversion rules in the repository and creates XML data files and streams that are used by content converter 204 and content generator 203 subsystems to create dynamically content for specific platforms and device frameworks. The XML files created represent the data and properties of any service and are used to generate the user interface, interaction model and view of the service. HTML converter 208 is also responsible for converting other XML and other custom content data feeds from a variety of sources. HTML converter 208 is designed to be extended using a plug in architecture for adding on new conversion modules. HTML converter 208 is responsible for language, encoding and XML document type destination (DTD) conversion. HTML converter 208 allows custom code and routines to be used to parse and convert HTML and XML files.

Visual layout designer 209 is responsible for providing the user interface for creative professionals and business users to rapidly layout and customize rich interactive services. Visual layout designer 209 is used to provide a drag and drop environment for defining and creating the content transformation and mapping rules. Visual layout designer 209 uses a "content wizard" to guide the user through all of the relevant steps of setting up a syndication "channel." The syndication content acquisition and conversion rules 207*a* are stored in a separate repository for access during the syndication process. Visual layout designer allows users to configure specific platform and language properties to create custom, platform specific services. Existing industry standard data types and content creation tools 223 can be used in the process to combine and layout content and designs for new interactive services. Visual layout designer 209 uses pattern engine 209 and repository 205 to read, query and store design information about the screens, templates and user interaction model. The design information is stored in both repository database 205*a* and the template and content repository database 209*a*.

Visual layout designer 209 uses such repositories to show designers specific variants of the design visually and enable them to easily design, layout and create multiple platform and language versions of their service. Visual layout designer 209 allows developers to rapidly integrated existing and new content to create rich new services targeted at a variety of platforms and devices. Visual layout designer 209 generates meta data information that is stored in the design 205*a* and conversion 207*a* repositories.

Device framework 210 is responsible for managing the client side components and logic to provide a rich compelling interactive user experience. In one embodiment, device framework 201 is a module within set-top box 106. In another embodiment, device framework 201 is a module within content harvest and conversion platform 130. Device framework 210 include routines and components for exploiting the platform application program interfaces (APIs), playing specific media types and enabling seamless user interaction models. Device framework 210 uses a proprietary cross platform method to enable content and services to run on any device capable for Internet standard protocols including ATVEF compliant receivers. Device framework 210 requests information and services from content engine 202 and executes the content on the device. Device framework 210 comprises of a rich set of object models and components that work across multiple platforms that abstract the core functionality required on every device.

Device framework 210 manages and controls the user experience including navigation, security and interaction models. Device framework 210 includes the ability to change dynamically the appearance of the interface providing highly customized look and feel. Device framework 210 manages the network connection for the device and control caching as well as peripheral devices. Device framework 210 includes components to exploit specific platforms and enable rich end user experiences for any device including set-top box 106. In one embodiment, set-top box 106 is an ATVEF compliant receiver or an advanced set-top box to deliver interactive and enhanced content.

Figure 2B:
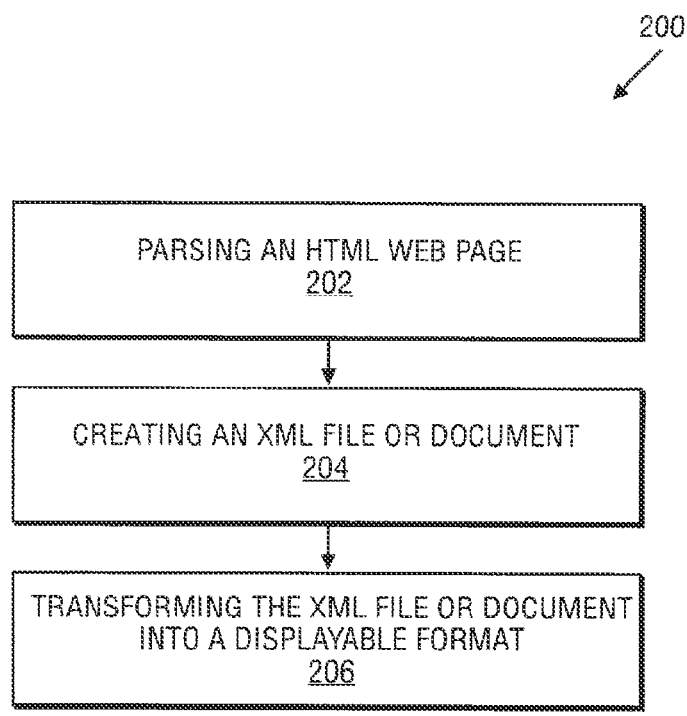
FIG. 2B illustrates a flow chart of processing an HTML page according to one embodiment.

FIG. 2B illustrates a flow chart of an operation 200 for processing an HTML web page. For purposes of explanation, operation 200 is performed by the subsystems of content harvest and conversion platform 130 and operation 200 begins at operation 202.

At operation 202, an HTML web page is parsed. For example, HTML parser engine 217 can parse an HTML web page from Internet content and web sites 213. In one embodiment, selected tags, styles, and content are either replaced or removed from the HTML page. Such a modification can be displayed in a browser to see the changes.

At operation 204, an XML file is created from the parsed HTML web page. For example, HTML-XML converter 208 can be used to convert the parsed HTML web page from parser engine 217 into an XML file which can be stored in XML data files 208*a*.

At operation 206, the XML file or document can be transformed into a displayable format. For example, content converter 204 and content generator 203 can be used together to transform an XML file stored in XML data files 208*a*. In one embodiment, an XML file is transformed into an HTML web page. An extensible style sheet transformation (XSLT) application can be used to perform such a transformation.

An XSL application transforms and translates XML data from one format into another. Thus, an XSL applications allows an XML file to be displayed in an HTML, PDR, Postscript or other like formats. That is, without an XSL application, the XML document would have to be manually duplicated, and then converted into each of separate format. Instead, an XSL application provides a mechanism of defining style sheets to accomplish these types of tasks. In particular, rather than having to change the data because of a different representation, an XSL application provides a complete separation of data, content, and presentation. Specifically, an XSL application is used to map an XML file into another representation. Using XSL is thus comparable to writing a Java program to translate data into, e.g., a PDF or HTML document, but supplies a standard interface to accomplish such a task.

In one embodiment, such a transformation can either occur within content harvest and conversion platform 130, syndication server 110, or even in set-top box 106. In other embodiments, the XML file can be transformed into another XML file. Alternatively, the XML file does not have to be transformed but can include an HTML page with special links.

Set-Top Box

Figure 3:
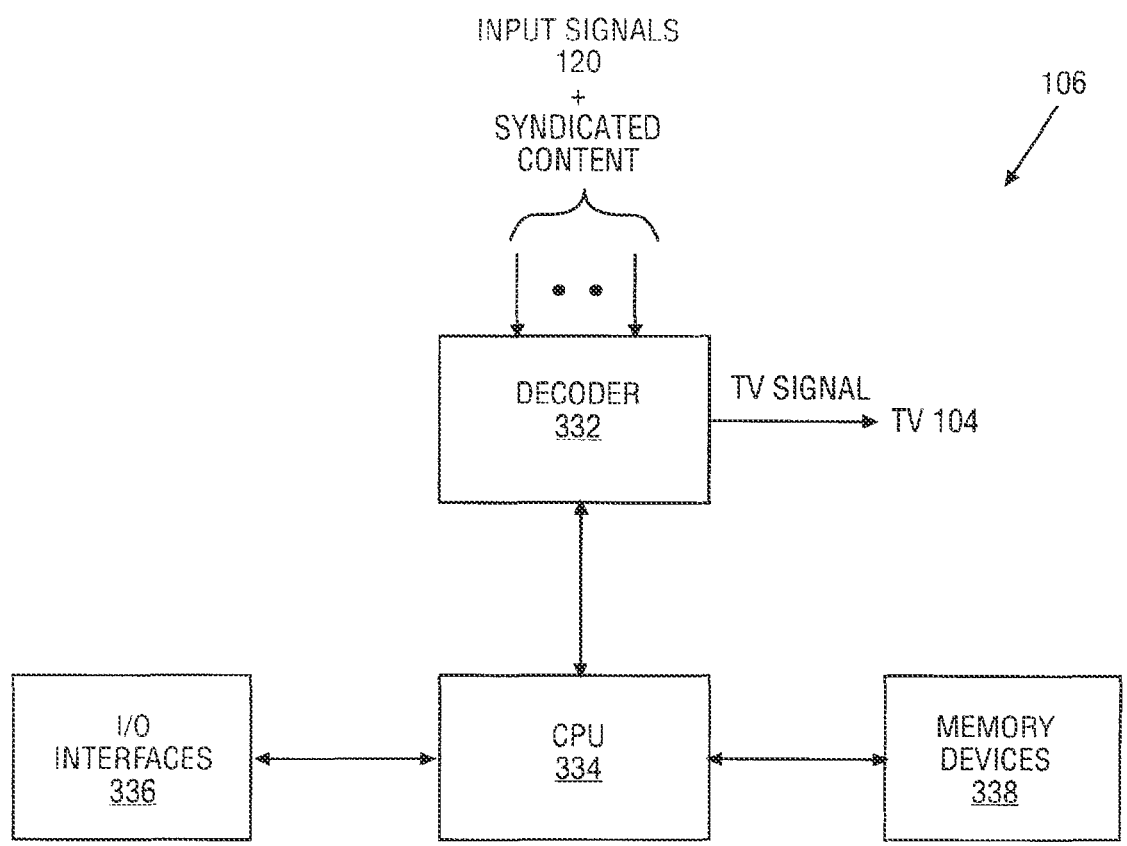
FIG. 3 illustrates a simplified block diagram of the set-top box of FIG. 1A according to one embodiment.

FIG. 3 illustrates a simplified block diagram of the set-top box 106 of FIG. 1 according to one embodiment. For purposes of clarity, only the basic components of set-top box 106 are shown in block diagram form. In one embodiment, set-top box 106 is configured to operate under the ATVEF standard. As such, set-top box 106 allows for enhanced, interactive television content.

Referring to FIG. 3, set-top box 106 includes a central processing unit (CPU) 304 coupled to memory devices 308, input/output (I/O) devices 306, and decoder 302. Decoder 302 can receive inputs signals 120 and syndicated content. The syndicated content can be enhanced, interactive television content. Decoder 302 can receive input signals 120 as analog (NTSC) or digital (ATSC) signals from a number sources including terrestrial, cable, and satellite sources. Decoder 302 outputs a TV signal to TV 104, which can be enhanced with the syndicated content. Although not shown in FIG. 3, device frame 270 can be a module operating within set-top box 106.

CPU 304 is the central control mechanism for set-top box 106. CPU 304 can execute code or instructions stored in memory devices 308 to process information from network 102. For example, I/O interfaces 306 may include a connection to network 102 provided by a dial-up modem. I/O 306 interfaces can also include an (IR) or (RF) interface for receiving inputs from remote controller 122. Memory devices 308 can include a machine-readable medium that provides (i.e., stores and/or transmits) information in a form readable by a machine such a processor, computer, or a digital processing device. For example, memory devices 308 may include a read only memory (ROM), random access memory (RAM), magnetic disk storage media, optical storage media, or flash memory devices. The code or instructions can be represented by carrier wave signals, infrared signals, digital signals, and by other like signals.

Syndication Server

Figure 4:
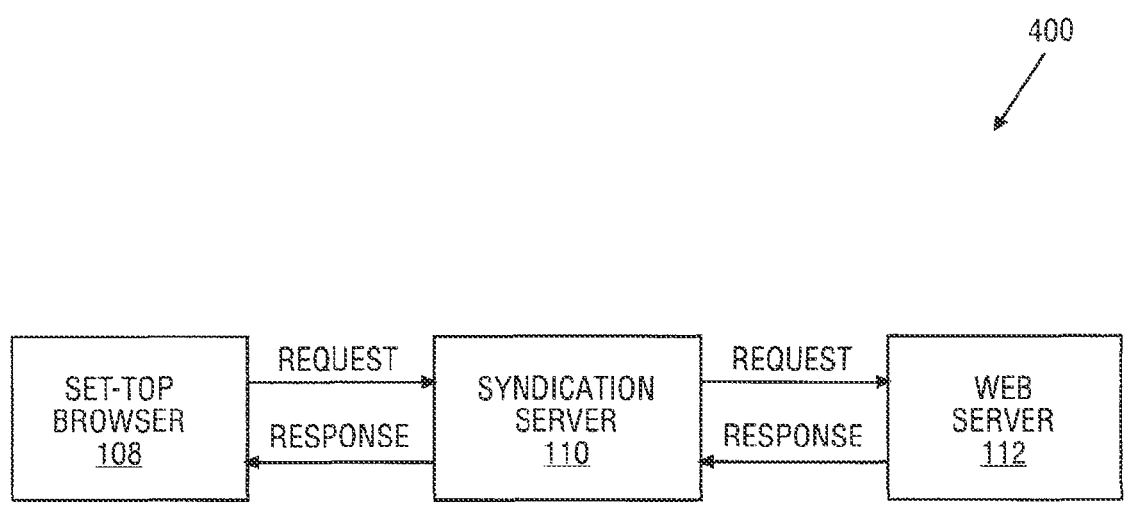
FIG. 4 illustrates a diagram to show syndicated browsing using the syndication server, set-top browser, and web server of FIG. 1A.

FIG. 4 illustrates a diagram 400 to show syndicated browsing using the syndication server 110, set-top browser 108, and web server 112 of FIG. 1A. In the example of FIG. 4, syndicated browsing is shown with an intermediate syndication server 110 to reformat syndicated content from web server 112 such that content from web server 112 fits into the application running on set-top browser 108.

Referring to FIG. 4, a user of set-top browser 108 can request access to a web page hosted by web server 112. For example, a user can input a specific universal resource locator (URL) address to access a specific web page. As such, set-top browser 108 sends a request to syndication server 110. Syndication server 110 then sends a request to web server 112 for the requested web page. Web server 112 can send the appropriate content (e.g., the HTML web page or XML data representing the web page) as a response to syndication server 110.

Syndication server 110 then transforms, e.g., the HTML web page, from web server 112 into syndicated content for the set-top browser 108 running on TV 104. In one embodiment, content harvest and conversion platform 130 performs the transformation process using software modules, which may be executed within the harvest and conversion platform 130 or within syndication server 110. Syndication server 110 can also perform such functions, which include caching web pages, storing web pages in a data base, consolidating diverse source feeds into an XML file or an HTML web page that is sent to set-top box 106, filtering information, or tracking usage.

Figure 5:
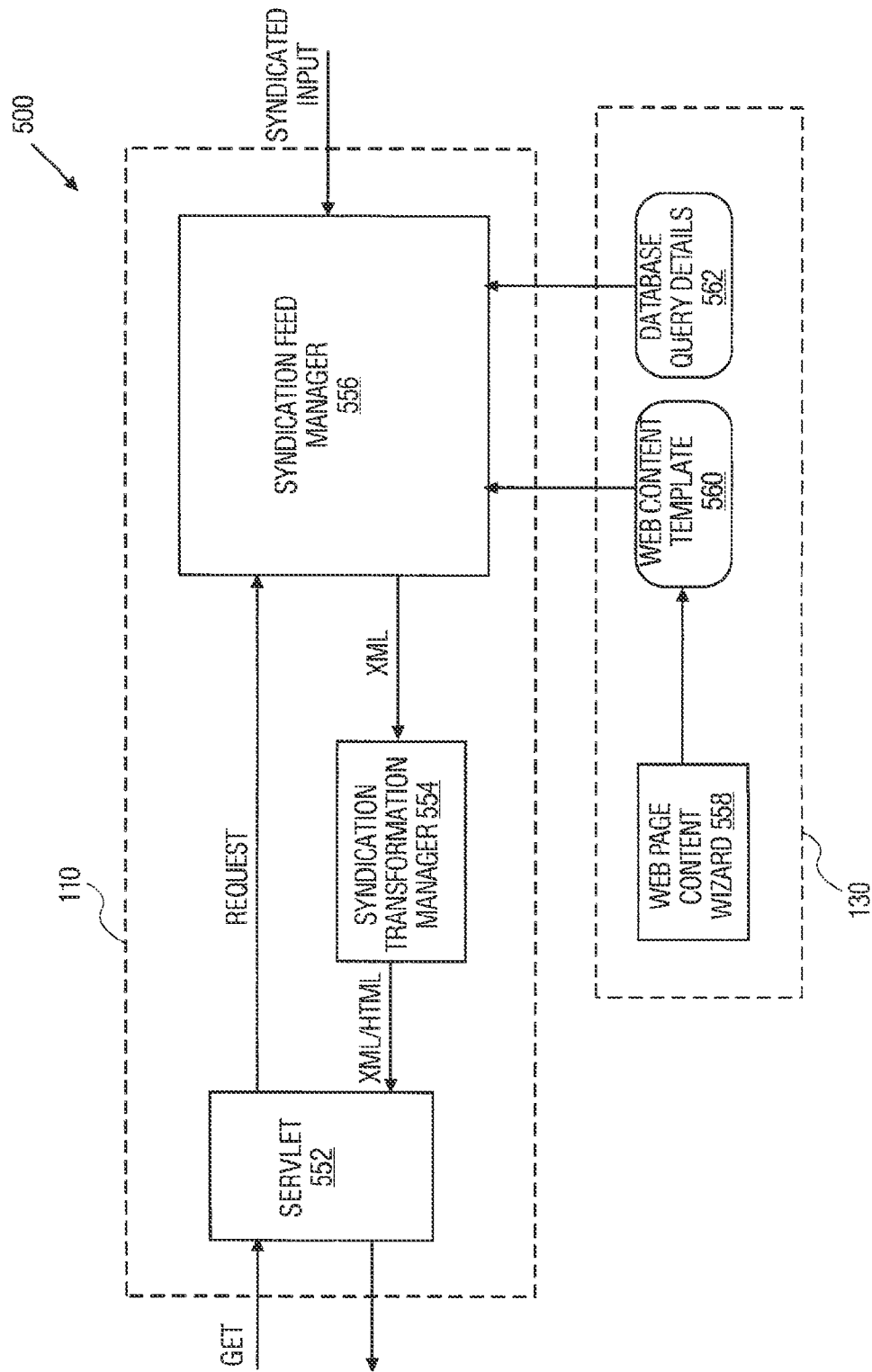
FIG. 5 illustrates a block diagram of the internal components of the syndication server interacting with components of the content harvest and conversion platform.

FIG. 5 illustrates a block diagram of the internal components of the syndication server 110 interacting with components of content harvest and conversion platform 130. Referring to FIG. 5, syndication server 110 includes servlet 552, syndication transformation manager 554, and syndication feed manager 556. In one embodiment, web page content wizard 558, web content template 560, and database query details 562 can be components within content harvest and conversion platform 130. Web page content wizard 558 and visual layout designer 209 in FIG. 2 can represent the same application.

Syndication Feed Manager

Syndication feed manager 556 can be hardware and/or software modules to receive syndicated input. The syndicated input is a syndication feed that is a source of syndication data such as, for example, a web page, XML file, XML data stream, or other like data streams. Syndication feed manager 556 pipes the syndicated data into syndication server 110. In one embodiment, if the syndication input is a web page, web page content template 560 is used to direct syndication feed manager 556 to the parts of the web page that are of interest. Web content template 560 formats the parts into an XML file for output.

In one embodiment, syndication feed manager 556 is wrapped by a java bean to expose the Document Object Model (DOM) of the XML output as an Application Program Interface (API). A DOM provides a means of manipulating data for an XML file or document. The DOM provides a representation of an XML file or document as a tree, to provide easy manipulation and alteration. A java bean is a program component which can be executed by a client. Thus, syndication feed manager 556 may be embedded into servlet 552, Java Server Pages (JSP), or Application Server Pages (ASP). A JSP is used to control the content or appearance of web pages through the use of a servlet, which is a small program that are specified in the web page and run on the web server to modify the web page. An ASP is an HTML page that includes one or more scripts (small embedded programs) that are processed by a web server before the page is sent to the user.

Web Page Content Wizard

Web page content wizard 558 is an authoring application tool to create web page templates for use by syndication feed manager 556. In other embodiments, syndication feed manager 556 or syndication transformation manager 554 can act an authoring application tool. To create web page templates, web page content wizard 558 allows content to be marked up and mapped to a template for use by syndication feed manager 556. Web page content wizard 558 starts with a web page selected by a user and displays the web page with the html structure revealed. The user can select content such as, for example, "the second paragraph" or the "table2, row 3, cell 4" and label it for inclusion into a separate template.

A web page capture template is built as the user progresses, starting with a root node that references the user elected web page, and progressing to sub nodes that reference user elected content on the web page, and further to other web pages referenced from the root page, or even web pages that are not physically linked to the root page, but whose content is relevant. The labels applied to the separate areas of content are meaningful human readable names, and are used in other areas of the design process. In one embodiment, the web page content template is an XML file. An exemplary XML file is shown below.

```
<NEWSTEMPLATE3   URL="www.meganews.com/today/
                 headlines.h-tml>
<STORY1>
<HEADLINE        CONTENT="table2,row*,col-umn1"\>
<DETAILURL       CONTENT = "table2,row*,column1"\>
<DETAILS         URL=DETAILURL CONTENT="paragraph2"\>
<IMAGE           URL=DETAILURL CONTENT="image3"\>
<STORY1\>
<NEWSTEMPLATE3\>
```

The template may also include macros and regular expressions to further refine content extraction. Web page content wizard 558 can capture repeating patterns, such as a list of products, and can navigate across the web pages. Web page content wizard 558 also allows rules to be specified, e.g., what action to take should some user content be missing or empty.

In other embodiments, web page content wizard 558 can be used to create a template using a DTD file or Xschema file. However, this creates just the entity names without the links specifying where the content came from. Web page content wizard 558 may then be used to load templates and fill in the links. The authoring operation of creating templates using web page content wizard 558 will be explained in further detail below.

Syndication Transformation Manager

Syndication transformation manager 554 accepts an XML stream or file output by syndication feed manager 556 and transforms the XML stream or file for display by set-top box 106. Syndication transformation manager 554 may output the XML file as HTML web page. Alternatively, syndication manager 554 may output the XML file as another type of XML file having different XML data from syndication feed manager 556.

In one embodiment, syndication transformation manager 554 performs the transformation using an XSLT application. XSLT is a text-based transformation in which XML data is merged with an Extensible Style Sheet Language (XSL). In one embodiment, an application such as RadTV Designer can be used to perform the XSLT transformation. In another embodiment, a text editor such as a word processing application can be used to perform the XSLT transformation. Syndication transformation manager 554 can use modules coded in java or java script and plugged in on the client side to perform such a transformation.

Servlet 552 is software component or small program that runs within syndication server 110. Servlet 552 is invoked after receiving XML or HTML data from syndication transformation manager 554 or after receiving a "GET" request from set-top box 106. The "GET" request can be for a specific web page.

Syndication Caching

Figure 6:
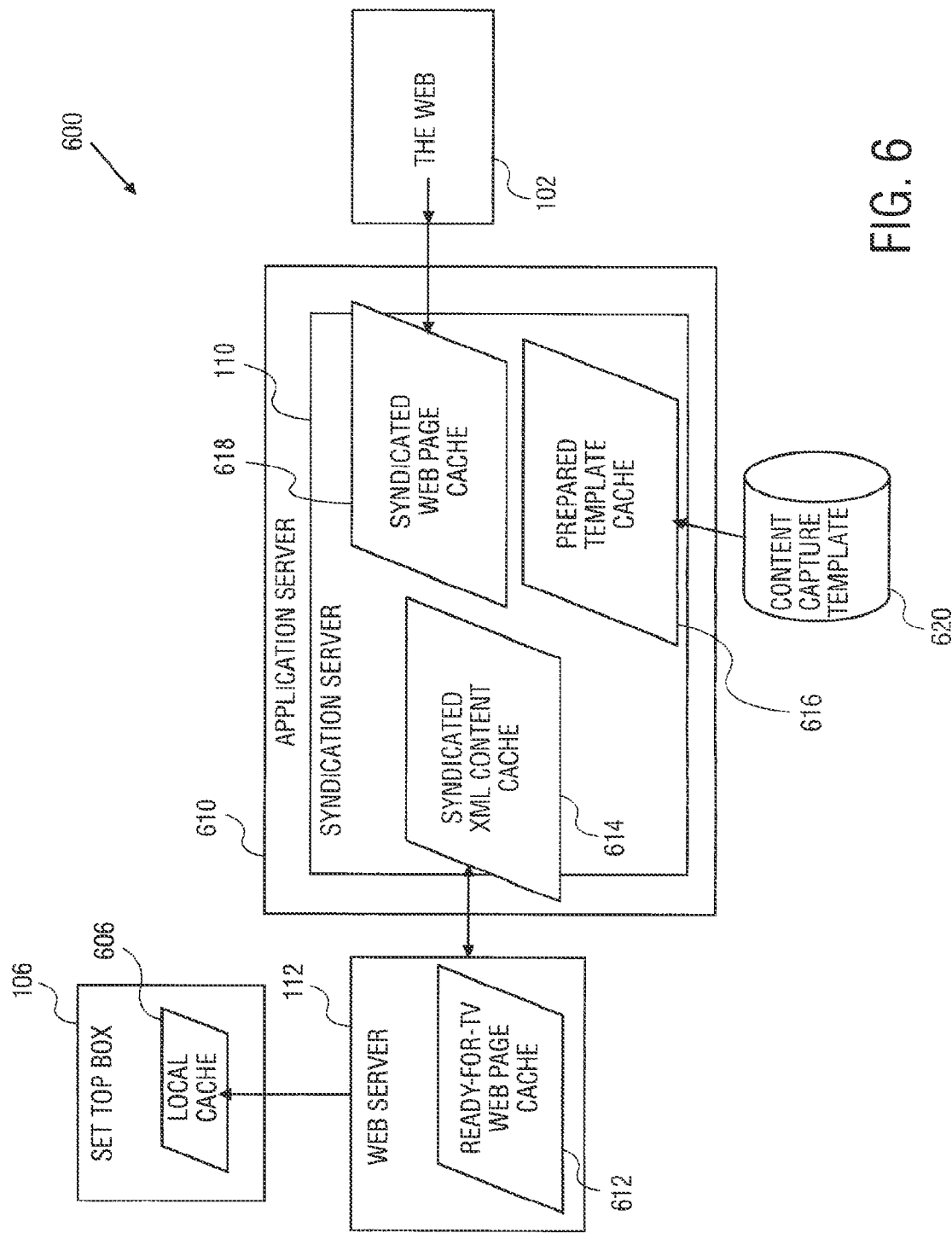
FIG. 6 illustrates a block diagram of caching within a syndication system according to one embodiment.

FIG. 6 illustrates a block diagram 600 to show syndication caching according to one embodiment. Referring to FIG. 6, block diagram 600 includes a set-top box 106 having a local cache 606, web server 612 having a ready-for-TV web page cache 612, and syndication server 110 having a syndicated web page cache 618 to receive web pages from the web 102, prepared template cache 616 for a content capture template 620, and a syndicated XML content cache 614. Syndication server 110 can operate within an application server 610.

The caches shown in diagram 600 can any type of memory devices. Such memory devices can include random access memory (RAM) devices, dynamic random access memory (DRAM) devices, flash memory devices, or other like memory devices. The caches can be controlled using any number of memory management methods, e.g., a Most Recently Used (MRU) method can be used to remove old data from the caches.

Local cache 606 for set-top box 106 my store pre-loaded content in anticipation of a scheduled television program such as a commercial. Syndication server 110 can coordinate with set-top box 106 to output cached contents to a user. Ready-for-TV web page cache 612 caches content, e.g., web pages, that are formatted for a particular device such as TV 104. In one embodiments, the contents of ready-for-TV web page cache 612 can be delivered to other web servers. This cache is useful if many users request the same web page at the same time.

Syndicated XML content cache 614 caches the XML DOMs that are the result of syndication. Syndicated XML content cache 614 is useful if more than one JSP, ASP, servlet or other technology that converts XML content into a TV Web Page and makes use of a single XML capture template. This happens if there many instances of a servlet/JSP accessing a single XML file concurrently, or there are many different TV page designs for displaying the same type of content, e.g., weather or news content. Syndicated XML content may obtain data from more than one web page.

Syndicated web page cache 618 caches web pages retrieved from syndicated sites. This cache is useful if more than one capture template gets content from a single web page. Prepared template cache 616 caches capture templates after they have been prepared for use. This cache is useful whenever the syndicated content needs to be refreshed from the web page. The caching provided in diagram 600 is useful in the event of a failure to syndication server 110. That is, stale cached data can be provided instead of providing no data. For example, if content related to a weather report was cached two hours ago, the same cached content can still be provided as the "latest forecast." In one embodiment, the contents of the caches can be stored in persistent data storage devices such as, for example, a fixed disk.

Items in the caches may become stale. For example, a web page of a weather forecast becomes out of date when a new forecast is issued. In one embodiment, to refresh an item in cache, the following techniques can be used based on expiration and validation of the item. If an item is expired, a timestamp is placed on the item the time it became stale. If an item is requested from the cache having a stale timestamp, its stale timestamp is compared to the current time. If the item is stale, a latest version of the data is obtained.

If an item is requested from a cache, the last updated timestamp of the cached version is compared to the source version, and the cache is updated as necessary. In one embodiment, the expiration/validation techniques may execute if an item is requested and found in a cache, or may run as a background process. The stale date and the request to perform validation should be provided by HTTP headers. If no HTTP headers are available, defaults are provided from the capture template. In one embodiment, syndication server 110 caches HTTP content in accordance with the HTTP standards based on HTTP headers and returns.

Content Acquisition and Transformation

Web Page Content Wizard/Visual Layout Designer

Figure 7:
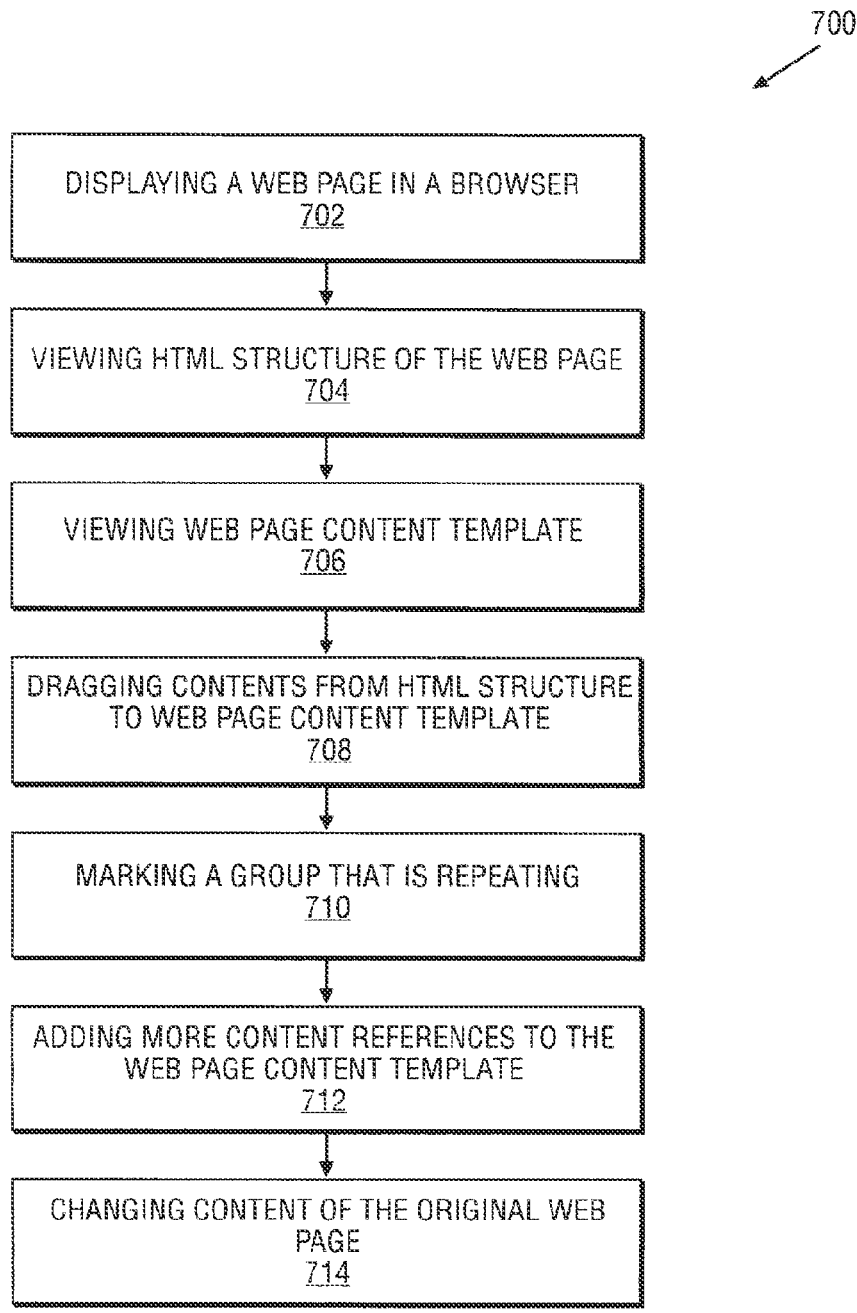
FIG. 7 illustrates a flow chart of an operation to create a template according to one embodiment.

FIG. 7 illustrates an operation 700 of using a web page content application authoring tool according to one embodiment. In one embodiment, the web page content application authoring tool is visual layout designer 209 as described in FIG. 2. In another embodiment, the web page content application authoring tool is the web page content wizard 558 as described in FIG. 5. Web page content wizard 558 can include a number of application tools operating together. For purposes of explanation, operation 700 refers to web page content wizard 558. Initially, operation 700 begins at operation 702.

Figure 8A:
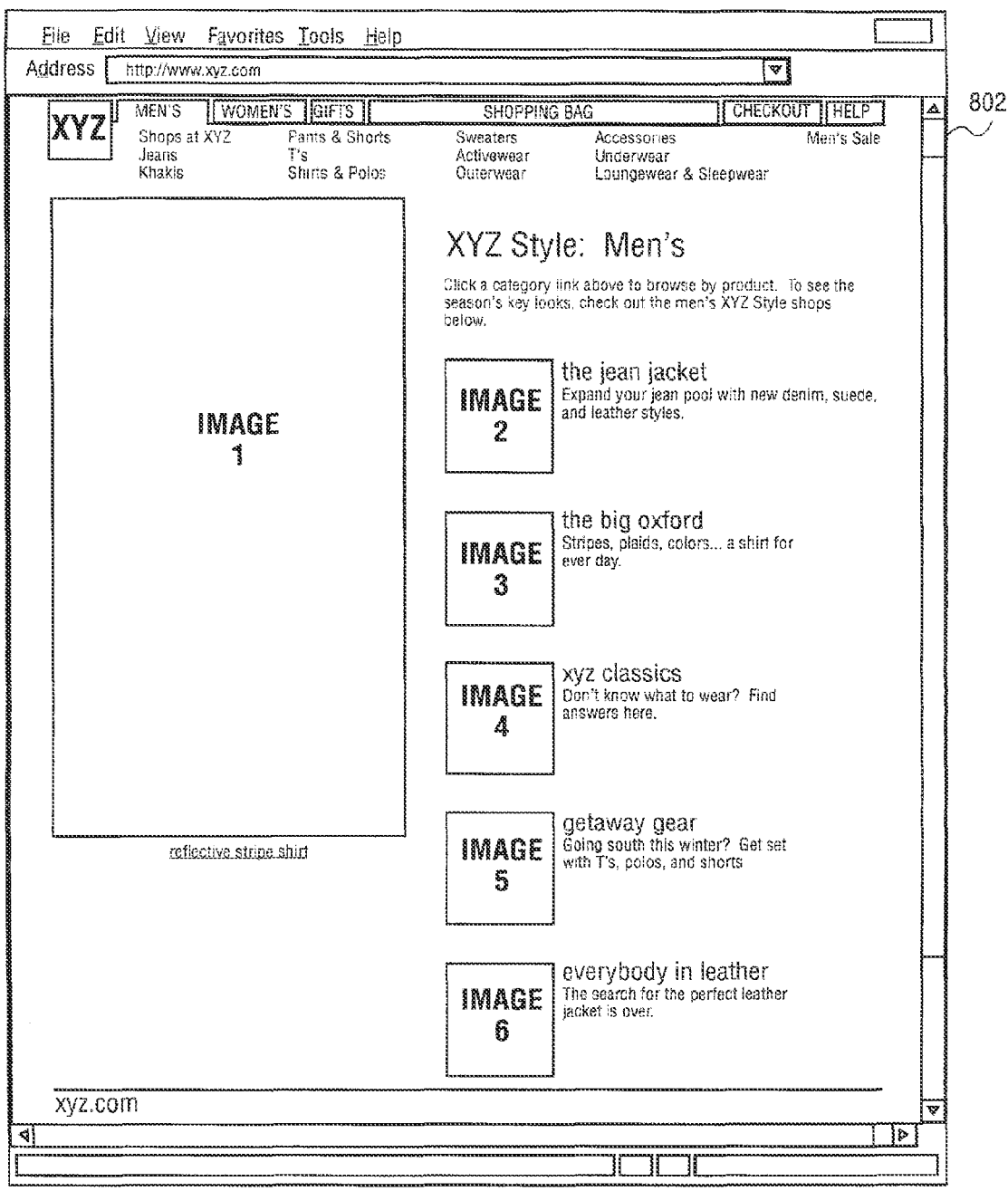
FIGS. 8A through 8O illustrate exemplary screen shots to create the template in FIG. 7.

At operation 702, a web page is displayed in a browser. For example, as shown in FIG. 8A, a screen shot 802 of a web page (at www.xyz.com) for a clothing retailer is displayed. The browser can be any type of browser such as, for example, the Internet Explorer™ browser by Microsoft®. Images 1 through 6 can represent any number of images of clothing items.

Figures 8B, 8C:
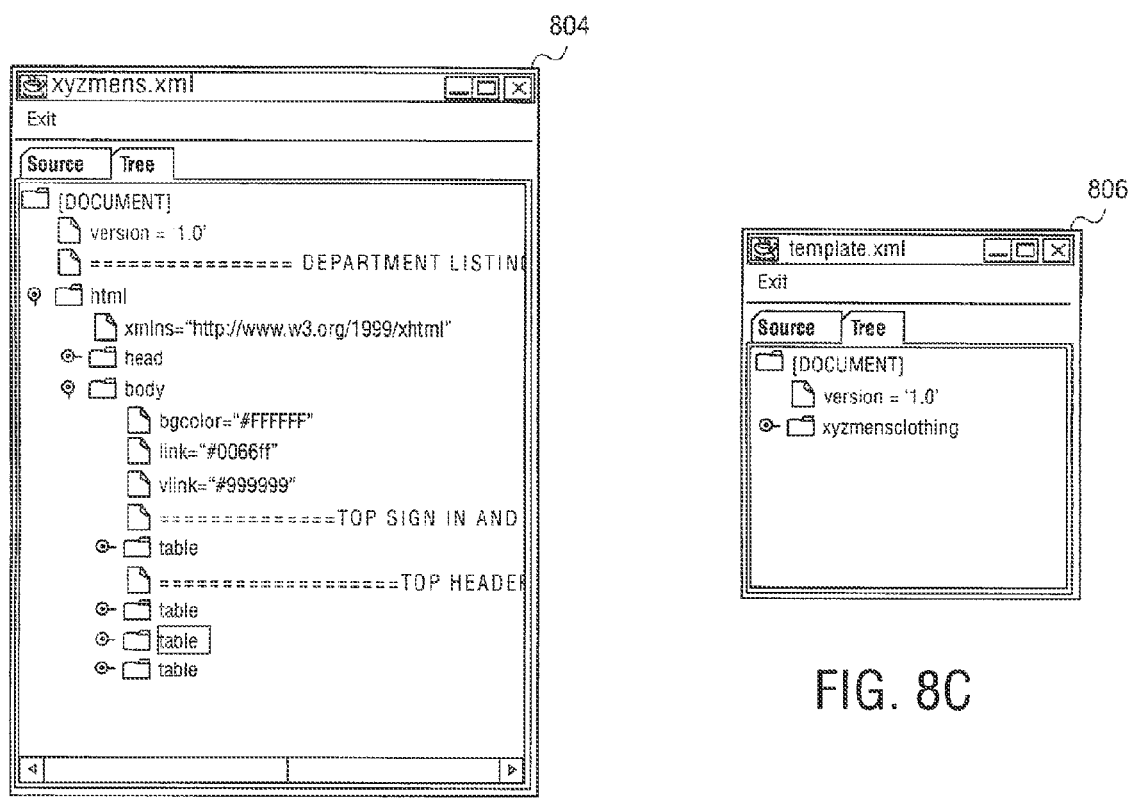

At operation 704, the HTML structure of the web page is viewed. For example, the web page can have a tree structure such as that shown in screen shot 804 in FIG. 8B. The tree structure can be titled as "xyzmens.xml." In one embodiment, the tree structure is shown along the web page. By viewing the tree structure, attributes of the HTML tree structure can be filtered out. In one embodiment, screen shot 804, details men's clothing categories. One of the tables is a list of men's categories. The rows in the table are individual categories.

At operation 706, a web page content template is viewed. For example, as shown in screen shot 806 in FIG. 8C, the web page content template is for an XML file. The XML file can be titled as "template.xml." The web page content template can be viewed alongside the HTML tree structure.

Figure 8D:
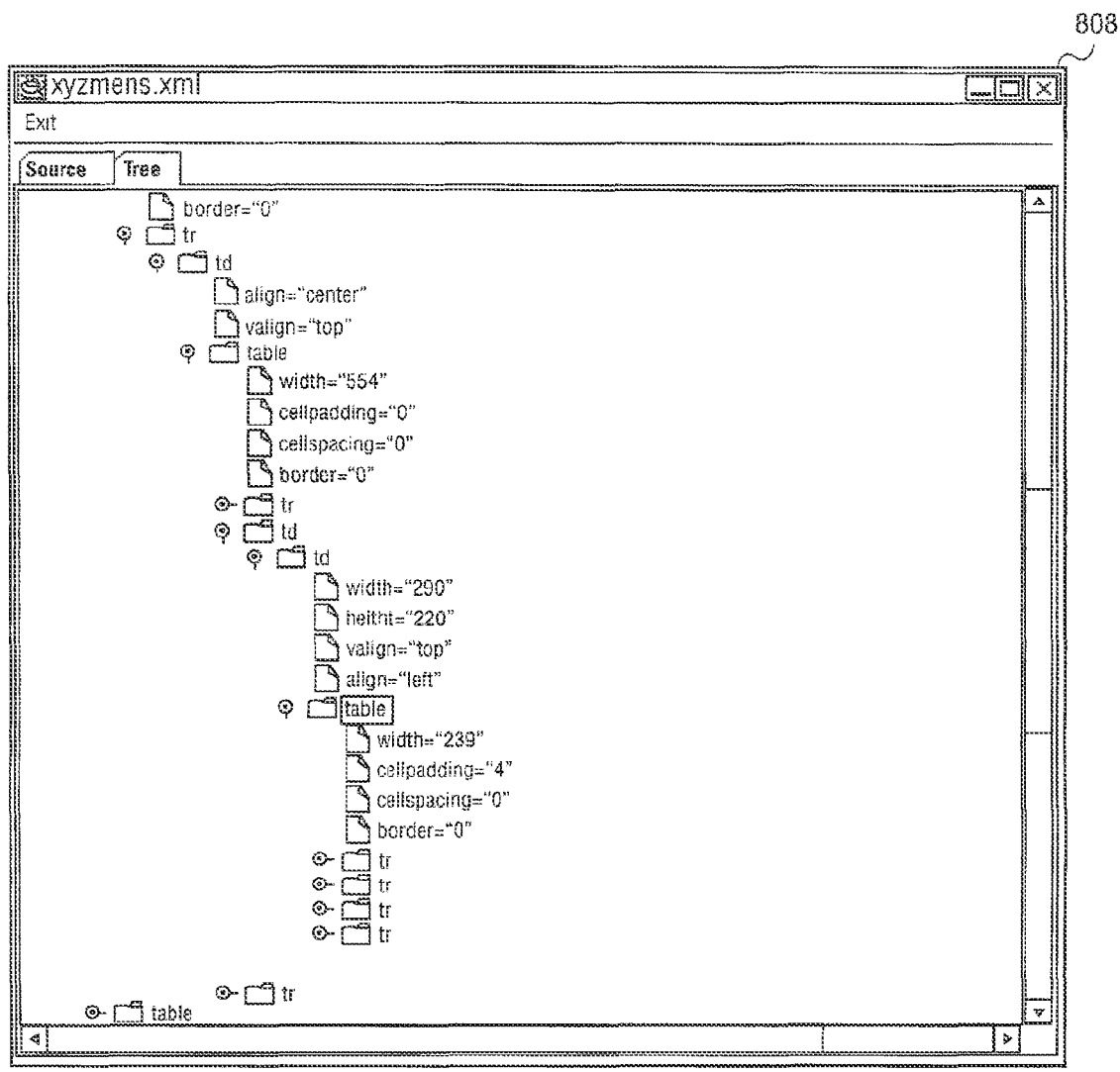
Figure 8E:
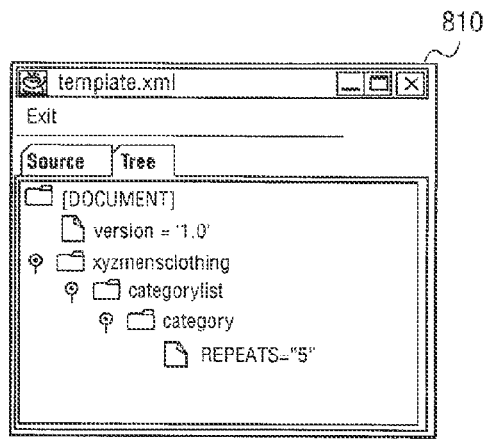

At operation 708, content references from either the web page or HTML tree are dragged into the web page content template. For example, the "html" folder in screen shot 804 is dragged across to the web page content template and renamed as "xyzmensclothing" as shown in screen shot 806. The HTML tree structure can be expanded as shown in screen shot 808 in FIG. 8D to view the list of categories. Here, by clicking on a table or row will highlight it in the browser window, a user can easily locate its location in the HTML tree. A marked table can be dragged to web page content template and renamed as "categorylist" as shown in screen shot 810 in FIG. 8E. The first "tr" in the table is dragged across and renamed as "category" as shown in screen shot 810.

Figure 8F:
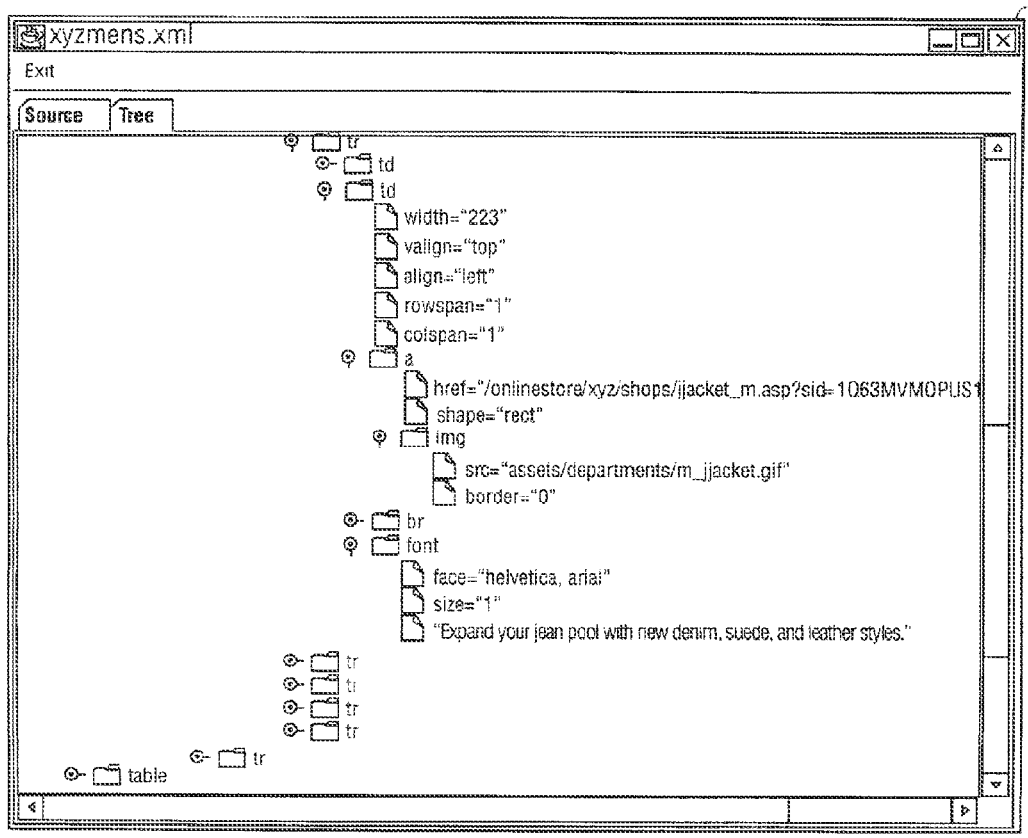
Figure 8G:
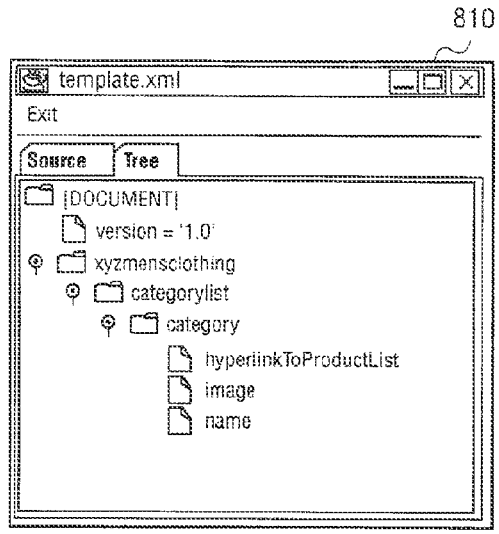

At operation 710, a group that is repeating is marked. For example, the "tr" table can be marked as repeating. The "tr" entry can be expanded in the HTML tree structure. The "tr" entry, image, and hyperlink can be dragged into the web page content template and renamed as shown in screen shot 812 in FIG. 8F. It should be noted that what has been captured in the web page content template is the location of the objects and not the object.

Figure 8H:
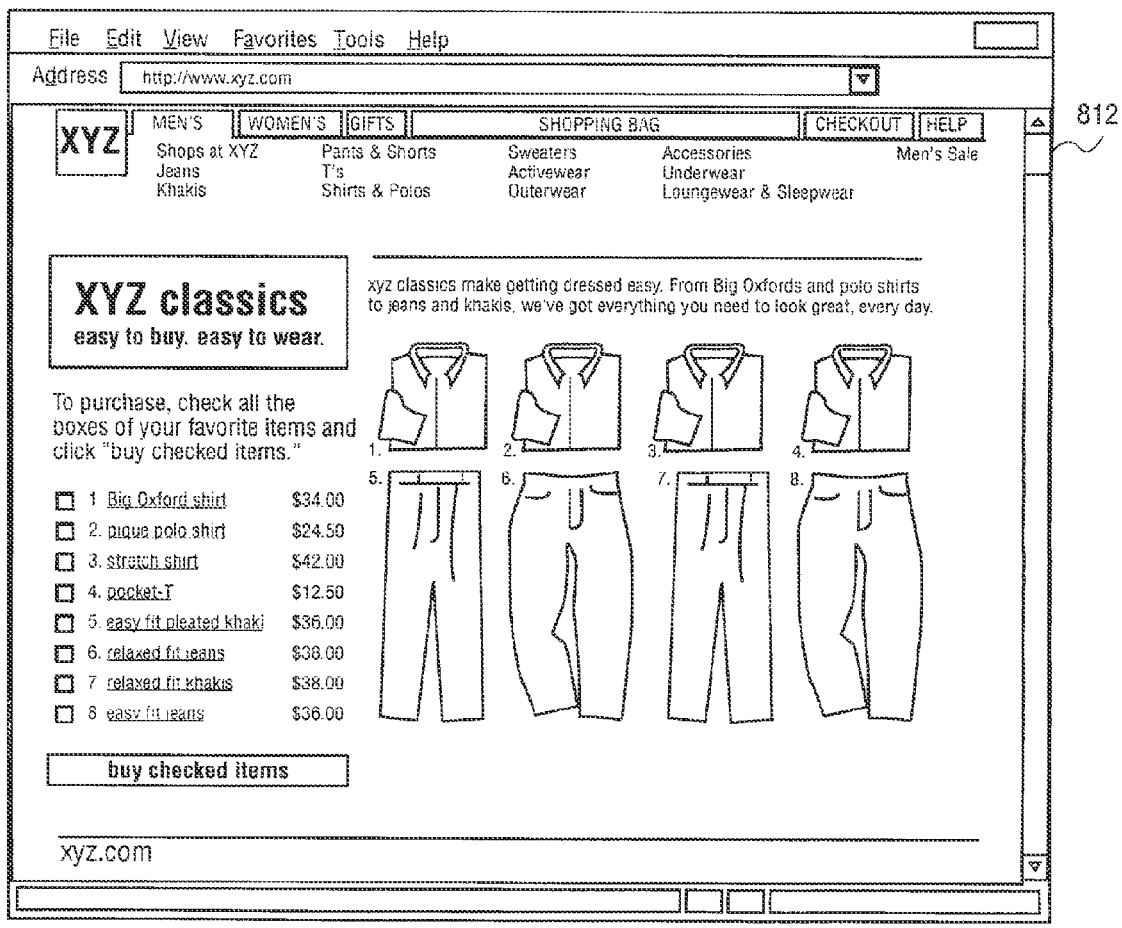

At operation 712, more content references are added to the web page content template by clicking through to another page. For example, at the web browser, a user can click through to the "xyz classics" as shown in screen shot 816 in FIG. 8H. Here, the HTML tree structure for screen shot 816 is loaded and expanded to provide a list of items as shown in screen shot 818 in FIG. 8I.

Figure 8L:
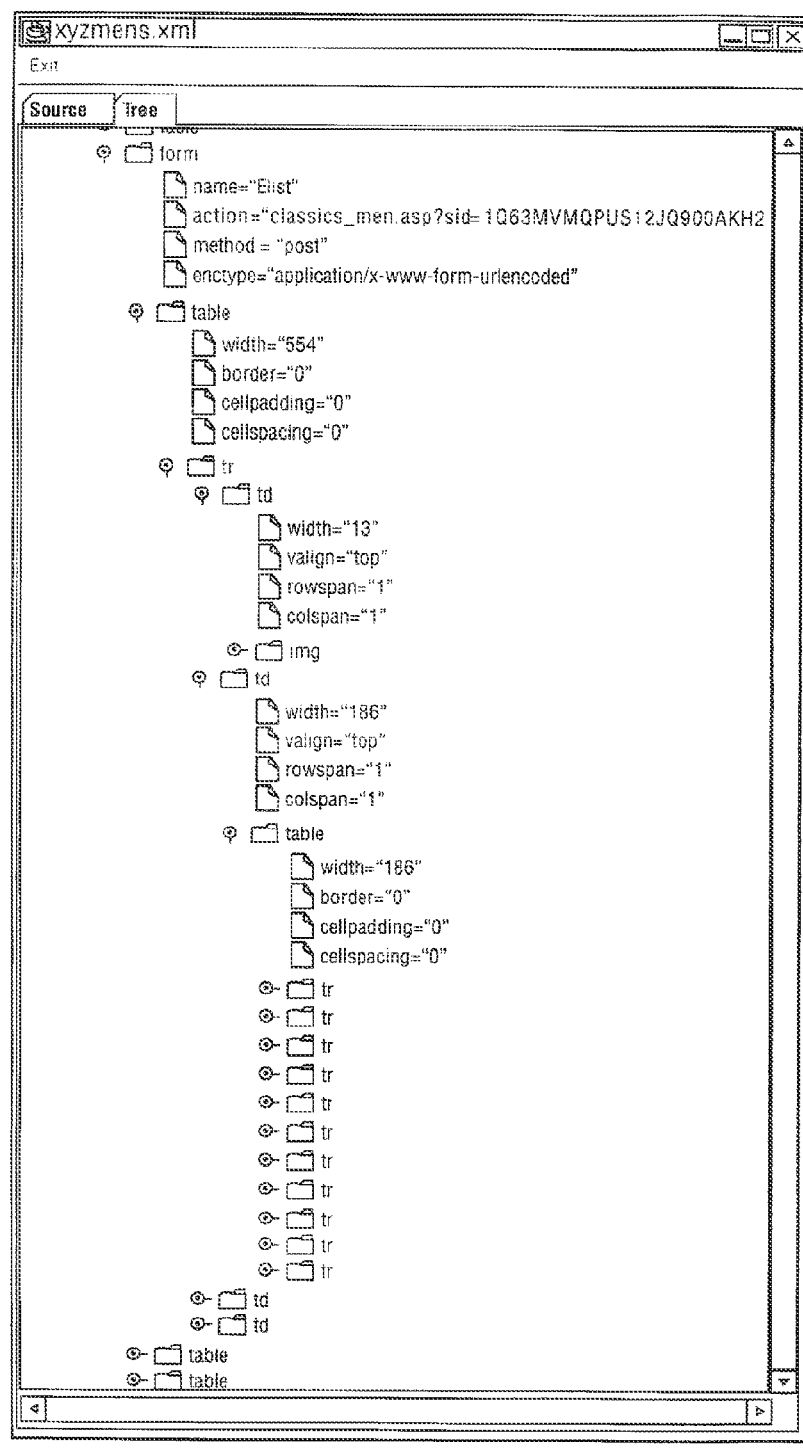
Figure 8J:
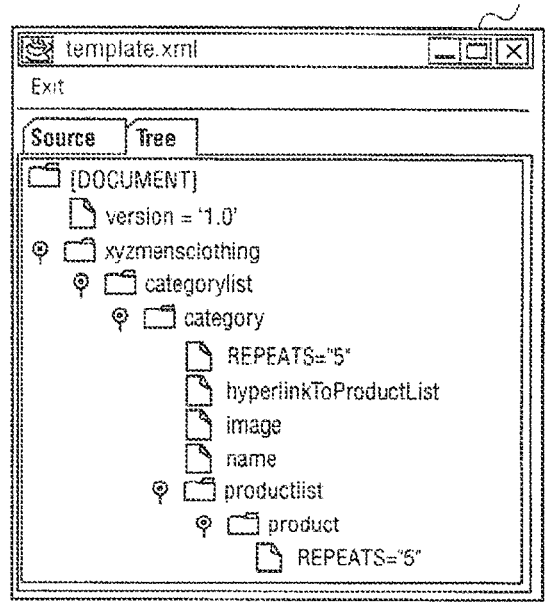

At operation 714, content of the original web page is changed. For example, the innermost table can be dragged into the web page content template tree and renamed as "product list" as shown in screen shot 820 in FIG. 8J. It should be noted that in the expanded tree there are 11 "tr" entries, but only 8 items of clothing listed in the browser. The list of items of clothing actually begins on the third "tr" entry, and continues to the second last. The third "tr" can be dragged across to the web page content template and renamed as "product" as shown in screen shot 820. This item can be marked as repeating.

Figure 8K:
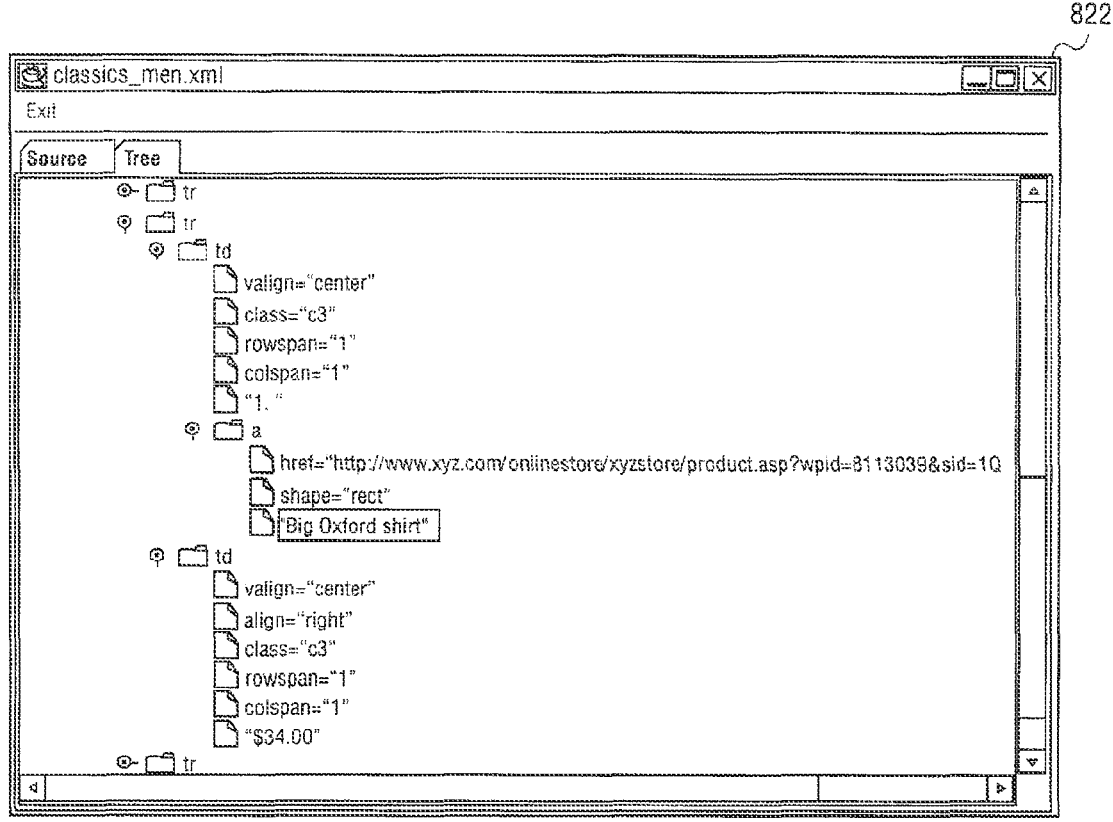
Figure 8L:
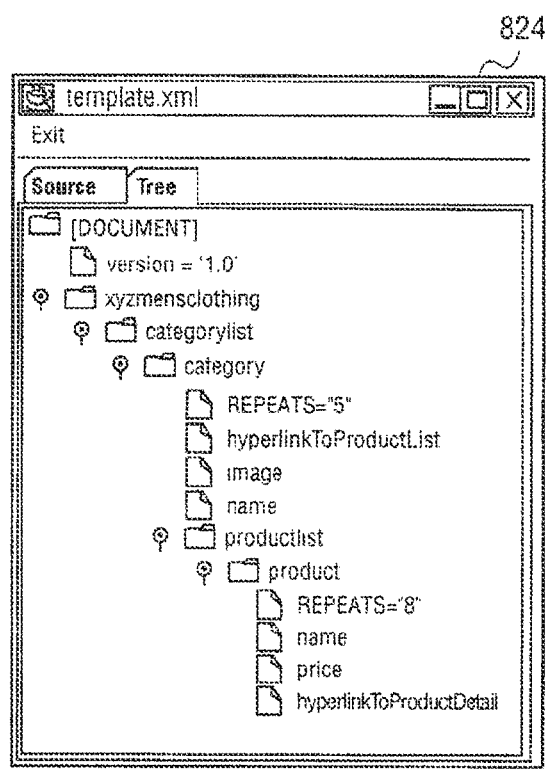
Figure 8M:
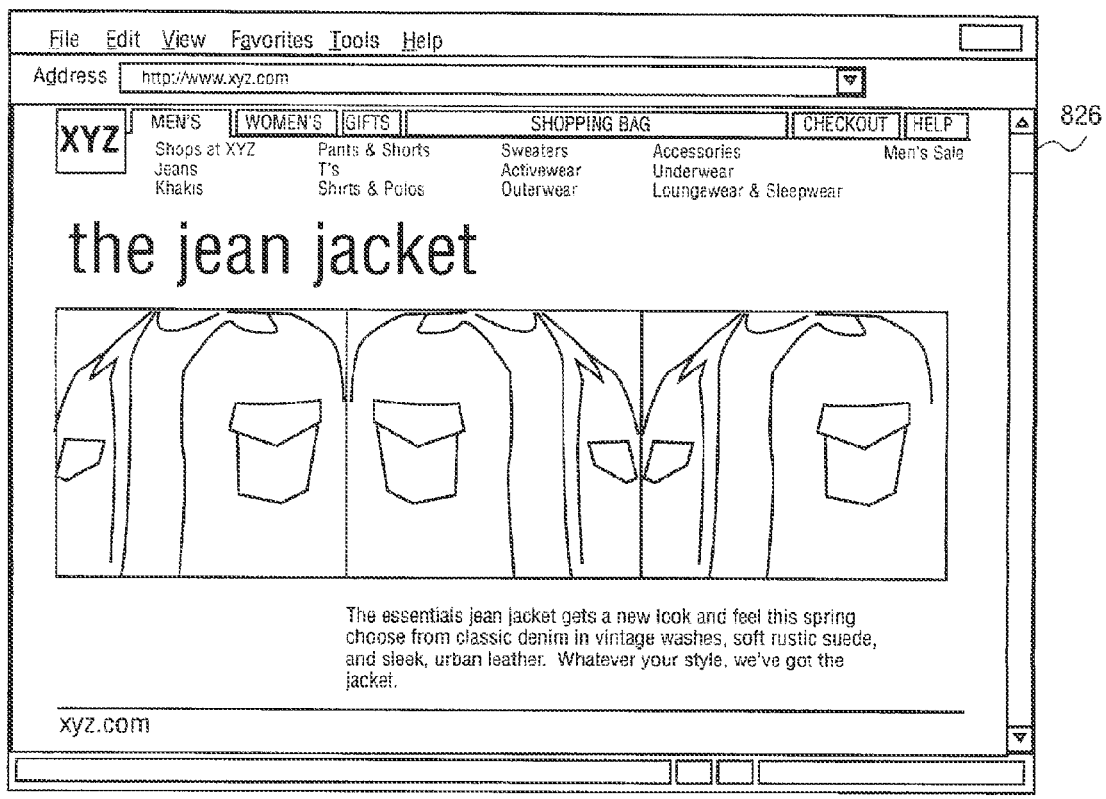

In the HTML structure tree, the "tr" is expanded as shown in screen shot 822 in FIG. 8K. The name, price and URL are dragged for more product detail to the web page content template as shown in screen shot 824 in FIG. 8L. Back on the category page, click on "the Jean Jacket" and discover that the layout of the items is completely different to the layout for "XYZ Classics" as shown in screen shot 826 in FIG. 8M. Thus, by using the web page content authoring application tool the original content can be altered to provide a new "look and feel." Such a new look and feel can be optimized for a TV centric environment in which items and categories are optimized for display on a TV screen.

Figures 8N, 8O:
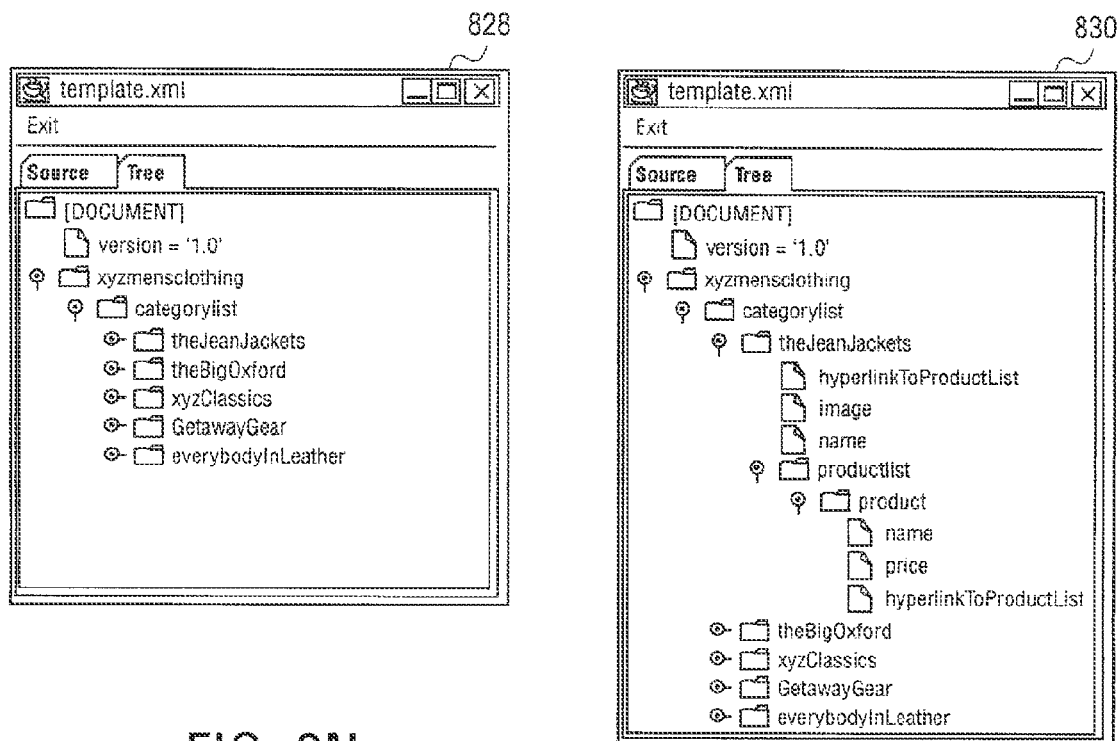

Further processing can also be performed. For example, in one option, the web page content template can be modified to capture only categories and to create a new web page content template for each page that lists items. The can later be combined in a transformation process. In another option, the web page content template can be modified, so as not to define the list of categories as a repeating group. For example, in the web page content template tree, the "repeats" entry can be removed and category copied for times. Each of the instances can be renamed after one of the xyz categories as shown in screen shot 828 in FIG. 8N.

Each of the named categories has all the entries under it that you defined for category earlier. Display the first "XYZ Mens Categories" web page in the browser, and drag the category 'tr' entries across from the browser onto the respective named categories. In the browser, click through to the list of products under 'the Jean Jackets', and drag across the new locations for the product list and details.

Web Page Content Capturing
Basics

A web page is a tree structure of HTML tags and attributes. The content of the web page is captured by navigating through a path from a root node of the tree structure to the content node. The web page and path are held against an element in the capture template file (i.e., an XML file). For example, an XML file having the following "size" element will obtain content from the body section, second table, first tree tag, and etc.

---

<Size Function="text( )"
Location="\body[0]\table[2]\tr[1].backslash- .td[2]\table[1]\tr[0]\td[1]\font[0- ]"
URL="0" />

---

The above capture template element is processed by syndication server 110 to obtain a result that will contain an element called 'size', whose text is the content found at the given location. The nesting of the elements in the capture template file is preserved through to the content file.

<Size>XS-XXL</Size>

The Uniform Resource Locator (URL) attribute supplies the URL of the web page containing the content. The Function attribute tells syndication server 110 what extra processing is required to get the content from the HTML tree. For example:

Function=@src will find the SRC attribute associated with an element and get the value.

Function=text will concatenate all text associated with an element

These functions should not be confused with processing by content converter 204. Content converter 204 converts and specifies data manipulation to be done once the content has been found. These functions specify how to find the data. The functions may also be considered as an extension of the path.

Axis Node

An axis node is a node in the HTML tree that serves as a reference point for finding other nodes. The root node is the default axis node, but other axis nodes may be defined. In the capture template file, an axis node is identified by comparing the path information from one element to the path information of another element. For example:

```
= <BulletPoint
      Location="\body[0]\table[2]\tr[1]\td[2]\table[3].backs- lash.tr[1]"
      NextItemAfter="1" URL="0">
    <BulletText
      Location="\body[0]\table[2]\tr[1]\td[2]\table[3]\tr[1]\td
      [1]\font[0]#text[0]" URL="0" />
  </BulletPoint>
```

The location in "BulletPoint" is a subset of the location in "BulletText". Thus, the HTML node identified by "BulletPoint" may serve as an axis node to the HTML node identified by "BulletText." Syndication server 110 finds the "BulletText" content by navigating to "bulletpoint" HTML node, and then using the relative path \td[1]\fo- nt[0]#text[0] to navigate on to BulletText.

When performing path analysis to identify an axis node, the tree structure of the template XML file is important. A location attribute will only be compared against location attributes of ancestor elements. In other words, the structure of the template file should reflect the structure of the HTML tree. To be more precise, the HTML node identified by an XML node in the template file should be a sub-node of the axis HTML node identified by a parent template XML node. This is a restriction, otherwise; the relationships of HTML nodes can be re-arranged and reordered as desired through placement of template elements. In one embodiment, the only time that the analysis to find an axis node is performed is for repeating patterns, which is described below. All other nodes are located from the root axis node.

Repeating Patterns

Web pages often include repeating patterns. To the end user, these repeating patterns appear as lists, table rows, and etc. When looking at the web page tree structure, they can be seen as identical sub-trees, repeating themselves one after the next. By identifying the root node of the first repeating sub-tree as the first axis node, the pattern is captured in the capture template file. Syndication server 110 uses the information in the capture template file to locate all the axis nodes in the HTML tree, and then 'walks' the axis nodes capturing the content from the sub-tree for each node. In the above 'BulletPoint' example, the "NextItemAfter" attribute identifies the number of sibling nodes (starting from the root node of the first repeating sub-tree) to count before the pattern repeats itself.

Figure 9A:
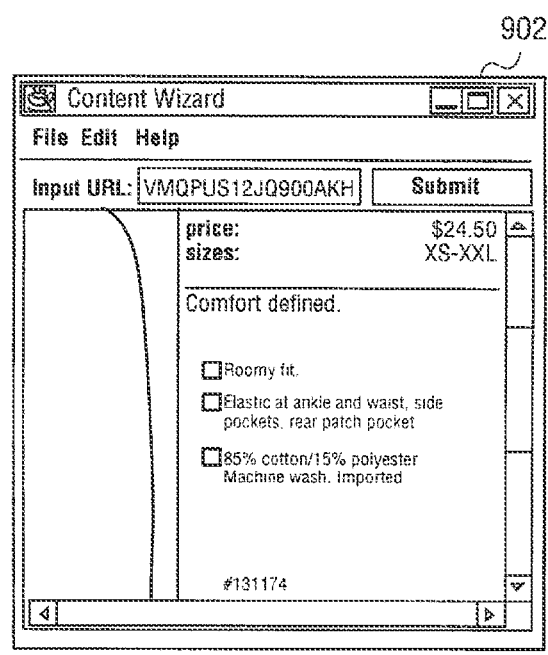
FIG. 9A illustrates an exemplary screen shot of an HTML web page.
Figure 9B:
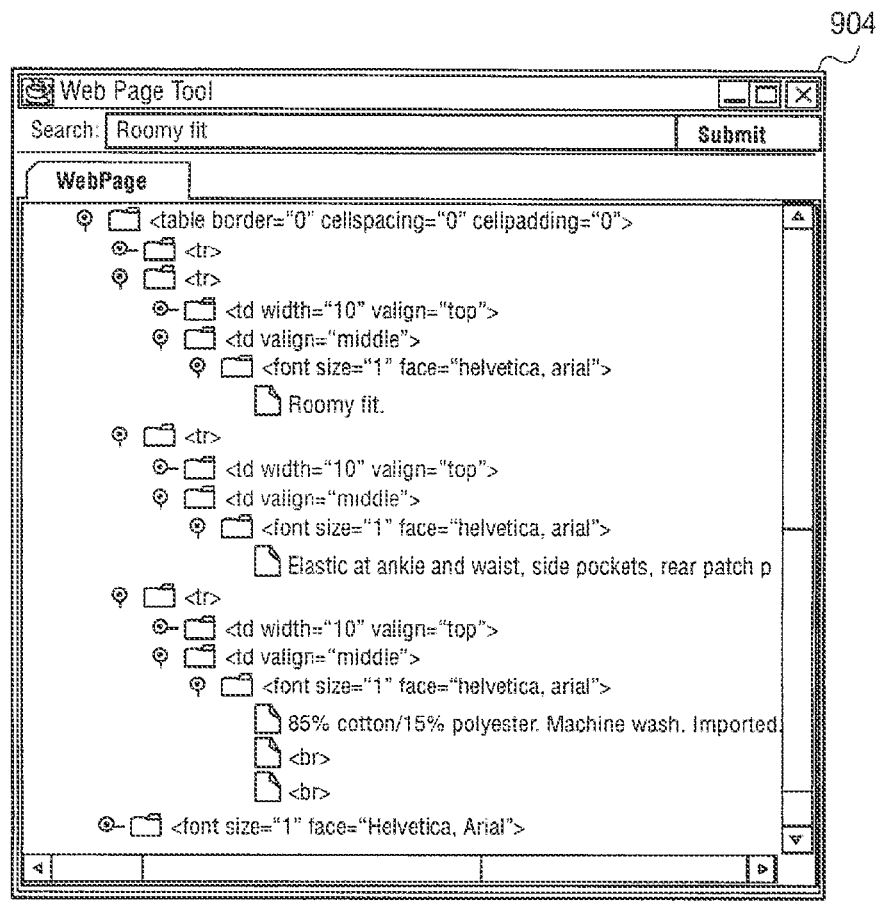
FIG. 9B illustrates an exemplary screen shot of an HTML tree structure of the web page of FIG. 9A.

As shown in FIG. 9A, a screen shot 902 is illustrated having tree bullet points seen through a browser. The same bullet points can be seen in the HTML tree as shown in screen shot 904 in FIG. 9B. The second "tr" node of the table is the root node of the repeating subtree. This is the first of the three axis nodes in this example. Each axis node has a subnode containing text that can be navigated using a single path definition from the axis node.

Capturing Content from Nodes

Node content functions inform syndication server 110 how to extract content. A node content function starts from a node and gathers content relative to the node.

Types of Function

@<attribute name>

All

AllText

Text

An exemplary HTML content to illustrate what the functions do is illustrated in Table 1.

TABLE 1

```
<TR>
<TD BGCOLOR="#04649C">
<IMG SRC="http://image.weather.com/pics/blank.gif" WIDTH="125"
HEIGHT="4" BORDER="0" ALT=""><BR>
<FONT FACE="Geneva, Arial, Sans Serif" SIZE="1">
<B>
<A HREF="/aboutus/">
<FONT COLOR="#FFFFFF" STYLE="text-decoration: none">
About</FONT>
</A>
<BR>
<A HREF="/abounts/">
<FONT COLOR="#FFFFFF" STYLE="text-decoration: none">The
Weather Channel
</FONT>
</A>
</B>
</FONT>
<BR>
<IMG SRC="http://image.weather.com/pics/blank.gif" WIDTH="125"
HEIGHT="4" BORDER="0" ALT="">
</TD>
</TR>
```

The "@<attribute name>" function, e.g., @SRC—Starting from the first <IMG>, retrieves the value for SRC, =http://image.weather.com/pics/blank.gif. The "All" function, starting from the first <FONT>, retrieves one long string containing all elements, attributes and text, as shown below.

"<FONT COLOR="#FFFFFF" STYLE="text-decoration: none">About</FONT></A><BR> <A HREF="/aboutus/"><FONT COLOR="#FFFFFF" STYLE="text-decoration: none">The Weather Channel</FONT></A></B></FONT>"

The "All Text" function, starting from the first <FONT>, retrieves all text "About The WeatherChannel" (A blank is inserted between different sections of text). The "Text" function, starting from the first FONT, retrieves the text associated with FONT, "About."

Defining XML Documents

XML files or documents that are created can be used by content harvest and conversion platform 130 and syndication server 110 and can be defined for specific types of applications and audiences using document type definitions (DTDs). A DTD establishes a set of constraints for an XML file or document. That is, a DTD defines the way an XML document should be constructed. For example, content related to different types of services (e.g., news, weather, traffic, stock, etc.) may have different types of DTDs.

In one embodiment, content harvest and conversion platform 130 and syndication server 110 can use default DTDs for different types of services being provided. In particular, an industry standard DTD can be used as a baseline. The following are exemplary namespaces, which can be used for services providing news, weather, traffic, or stock content:

http://www.metatv.com/svc/weather
http://www.metatv.com/svc/traffic
http://www.metatv.com/svc/stock
http://www.metatv.com/svc/news A namespace is a mapping between an element prefix and a URI. This mapping is used for handling namespace collisions and defining data structures that allow parsers to handle collisions.

NEWS EXAMPLE

The industry standard DTD for news is News Industry Text Format (NITF), which can be found at http://www.iptc.org/iptc/. A DTD that is a subset of nitf may be found at http://www.xmlnews.org/. In one embodiment, the xmlnews.org DTD (xmlnews-story.dtd) is used. Xmlnewsorg also has meta definitions to describe news content (xmlnews-meta.dtd), which can also be used. These DTD's are designed for news articles. An exemplary XML file with a news DTD is shown in Table 2 below.

TABLE 2

```
<?xml version="1.0" ?>
- <news xmlns="http://www.metatv.com/svc/news"
        xmlns:xn="http://www.xmlnews.org/namespaces/meta#"
        xmlns:ctl="http://www.metatv.com/ctl">
  - <headline>
    - <hedline>
        <hl1>Search Resumes at Ski Resort</hl1>
      </hedline>
      <byline>By IAN PHILLIPS Associated Press Writer</byline>
    - <dateline>
        <location>CHAMONIX, France</location>
        <story.date>Monday January 25 1999 7:28 ET</story.date>
      </dateline>
    </headline>
  - <headline>
    - <hedline>
        <hl1>German Union Hopes To Avoid Strike</hl1>
      </hedline>
    - <dateline>
        <location>FRANKFURT, Germany</location>
      </dateline>
    </headline>
  </news>
```

Another exemplary XML file with a news DTD is shown in Table 3 below.

TABLE 3

```
<?xml version="1.0" ?>
- <nitf xmlns:ctl="http://www.metatv.com/ctl">
  - <xn:Resource xmlns:xn="http://www.xmlnews.org/namespaces/
      meta#">
      <xn:title>143 Dead in Colombia Earthquake</xn:title>
      <xn:creator>Jared Kotler</xn:creator>
      <xn:dateline>Bogota, Colombia, Monday January 25 1999 7:28
          ET</xn:dateline>
      <xn:language>en</xn:language>
    </xn:Resource>
  - <head>
      <title>143 Dead in Colombia Earthquake</title>
    </head>
  - <body>
    - <body.head>
      - <hedline>
          <hl1>143 Dead in Colombia Earthquake</hl1>
        </hedline>
      - <byline>
          <bytag>By Jared Kotler, Associated Press Writer</bytag>
        </byline>
      - <dateline>
          <location>Bogota, Colombia</location>
```

TABLE 3-continued

```
          <story.date>Monday January 25 1999 7:28 ET</story.date>
        </dateline>
      </body.head>
    - <body.content>
        <p>An earthquake struck western Colombia on Monday,
           killing at least 143 people and injuring more than 900 as it
           toppled buildings across the country's coffee-growing
           heartland, eivil defense officials said,</p>
        <p>The early afternoon quake had a preliminary magnitude of
           6, according to the U.S. Geological Survey in Golden,
           Colo. Its epicenter was located in western Valle del Cauca
           state, 140 miles west of the capital, Bogota.</p>
        <p>The death and damage toll appeared to be highest in
           Armenia, Pereira and Calarca: three cities near the
           epicenter.</p>
      </body.content>
    </body>
</nitf>
```

WEATHER EXAMPLE

A DTD can be created for a variety of audiences such as audiences interested in weather. An exemplary XML file with a weather DTD is shown in Table 4 below.

TABLE 4

```
- <location>
    San Francisco CA Weather Forecast
  - <day>
      Today
      <image>http://us.yimg.com/l/we/fc/66.gif</image>
      <temp>60°</temp>
      <skies>Partly Cloudy</skies>
      <hi>61°</hi>
      <lo>50°</lo>
      <Humidity>82%</Humidity>
      <Wind>N/3 mph</Wind>
      <Visibility>10 ml</Visibility>
      <Dewpoint>55°</Dewpoint>
      <Barometer>30 inches</Barometer>
      <Sunrise>06:21 a.m.</Sunrise>
      <Sunset>06:16 p.m.</Sunset>
    </day>
  - <day>
      Wed
      <image>http://us.yimg.com/l/we/fc/85.gif</image>
      <lo>Lo 47<lo>
      <hi>Hi 66</hi>
      <skies>Sunny</skies>
    </day>
  - <day>
      Thu
      <image>http://us.yimg.com/l/we/fc/85.gif</image>
      <lo>Lo 49</lo>
      <hi>Hi 60</hi>
      <skies>Sunny</skies>
    </day>
  - <day>
      Fri
      <image>http://us.yimg.com/l/we/fc/66.gif</image>
      <lo>Lo 50</lo>
      <hi>Hi 66</hi>
      <skies>PartlyCloudy</skies>
    </day>
  - <day>
      Sat
      <image>http://us.yimg.com/l/we/fc/66.gif</image>
      <lo>Lo 47</lo>
      <hi>Hi 69</hi>
      <skies>PartlyCloudy</skies>
    </day>
</location>
```

Figure 10:
FIG. 10 illustrates an exemplary screen shot of an XML document with a DTD for weather.

The XML file shown Table 4 can be transformed into an HTML web page to be displayed on TV 104. That is, syndication server 110 can transform the XML file in Table 4 to display a web page such as that shown in screen shot 1002 in FIG. 10. As such, syndication server 110 by using well defined DTDs can provide well formed content for specific audiences and services.

Thus, a method and system for transforming content for execution on multiple platforms have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

The invention claimed is:

1. A method comprising:
   managing rules for delivering platform-neutral content, to a plurality of different types of receiving devices for display on a plurality of different types of platforms operating within the receiving devices; and
   delivering the platform-neutral content to the plurality of different types of receiving devices for display on the plurality of different types of platforms based on the rules.

2. The method of claim 1, wherein the delivering of the platform-neutral content includes:
   targeting the platform-neutral content to specific receiving devices using the rules.

3. The method of claim 2, wherein the targeting of the platform-neutral content to the specific receiving devices is based on a type of the specific receiving devices.

4. The method of claim 1, wherein the managing of the rules for delivering platform-neutral content includes managing the rules for geographic or demographic targeting of the platform-neutral content.

5. The method of claim 1, further comprising:
   generating code or instructions for modifying the platform-neutral content for optimized display on the plurality of different types of platforms operating within the receiving devices.

6. The method of claim 5, wherein the code or instructions for modifying the platform-neutral content is generated based on a type of the receiving devices.

7. The method of claim 1, wherein the delivering of the platform-neutral content includes integrating the platform-neutral content, interactive services and media assets into a data transmission for the receiving devices.

8. An apparatus comprising:
   a processor configured to
      manage rules for delivering platform-neutral content to a plurality of different types of receiving devices for display on a plurality of different types of platforms operating within the receiving devices; and
      deliver the platform-neutral content to the plurality of different types of receiving devices for display on the plurality of different types of platforms based on the rules.

9. The apparatus of claim 8, wherein the processor is further configured to target the platform-neutral content to specific receiving devices using the rules.

10. The apparatus of claim 8, wherein the processor is further configured to manage the rules for geographic or demographic targeting of the platform-neutral content.

11. The apparatus of claim 8, wherein the processor is further configured to generate code or instructions for modifying the platform-neutral content for optimized display on the plurality of different types of platforms operating within the receiving devices.

12. The apparatus of claim 8, wherein the processor is further configured to integrate the platform-neutral content, interactive services and media assets into a data transmission for the receiving devices.

13. The apparatus of claim 8, wherein the apparatus is a gateway.

14. The apparatus of claim 8, wherein the apparatus is a client device.

15. The apparatus of claim 8, wherein the apparatus is a server.

16. A non-transitory machine-readable medium having executable instructions stored thereon that, when executed by a machine, perform steps comprising:
   managing rules for delivering platform-neutral content to a plurality of different types of receiving devices for display on a plurality of different types of platforms operating within the receiving devices; and
   delivering the platform-neutral content to the plurality of different types of receiving devices for display on the plurality of different types of platforms based on the rules.

17. The non-transitory machine-readable medium of claim 16 having executable instructions stored thereon that, when executed by a machine, perform steps comprising:
   targeting the platform-neutral content to specific receiving devices using the rules.

18. The non-transitory machine-readable medium of claim 16, wherein the managing of the rules for delivering platform-neutral content includes managing the rules for geographic or demographic targeting of the platform-neutral content.

19. The non-transitory machine-readable medium of claim 16 having executable instructions stored thereon that, when executed by a machine, perform steps comprising:
   generating code or instructions for modifying the platform-neutral content for optimized display on the plurality of different types of platforms operating within the receiving devices.

20. The non-transitory machine-readable medium of claim 16, wherein the delivering of the platform-neutral content includes integrating the platform-neutral content, interactive services and media assets into a data transmission for the receiving devices.

* * * * *

UNITED STATES PATENT AND TRADEMARK OFFICE
CERTIFICATE OF CORRECTION

Page 1 of 2

PATENT NO. : 8,667,387 B2
APPLICATION NO. : 13/083710
DATED : March 4, 2014
INVENTOR(S) : Ranjit Sahota et al.

It is certified that error appears in the above-identified patent and that said Letters Patent is hereby corrected as shown below:

Title Page, Column 1, Inventors, Line 3:
 Please delete "San Anselmo," and insert --Fairfax,--, Title Page 2, Column 2, Other Publications, Line 1:
 Delete "nternational" and insert --International--, Title Page 3, Column 1, Other Publications, Line 51:
 Delete "ak,m" and insert --al,--, In the Drawings Sheet 2 of 23, Reference Numeral 152, FIG. 1B:
 Delete "152" and insert --154--, In the Specification Column 4, Detailed Description, Line 15:
 Delete "102" and insert --112--, Column 4, Detailed Description, Line 33, first occurrence:
 Delete "102" and insert --112--, Column 4, Detailed Description, Line 64:
 Delete "102" and insert --110--, Column 7, Detailed Description, Line 18:
 Delete "210" and insert --202--, Signed and Sealed this
Ninth Day of June, 2015

Michelle K. Lee
*Director of the United States Patent and Trademark Office*

CERTIFICATE OF CORRECTION (continued)
U.S. Pat. No. 8,667,387 B2

Column 8, Detailed Description, Line 32:
    Delete "209a." and insert --205a.--, Column 9, Detailed Description, Line 54:
    Delete "209" and insert --206--, Column 13, Detailed Description, Line 10:
    Delete "h-tml" and insert --html--, Column 13, Detailed Description, Line 12:
    Delete "col- umn1" and insert --column 1--, Column 13, Detailed Description, Line 37:
    After "syndication", insert --transformation--, Column 13, Detailed Description, Line 62:
    Delete "612" and insert --112--, Column 18, Detailed Description, Line 18:
    Delete "<B>" and insert --<B>  --, Column 18, Detailed Description, Line 23:
    Delete "<BR>" and insert --<BR>  --, Column 20, Detailed Description, Line 9:
    Delete "said," and insert --said.--, In the Claims Column 21, Claim 8, Line 49:
    Delete "to" and insert --to:--.